(12) United States Patent
Mitsunaga

(10) Patent No.: US 8,831,346 B2
(45) Date of Patent: Sep. 9, 2014

(54) IMAGE PROCESSING APPARATUS AND METHOD, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/428,997

(22) Filed: Mar. 23, 2012

(65) Prior Publication Data

US 2012/0250998 A1 Oct. 4, 2012

(30) Foreign Application Priority Data

Mar. 31, 2011 (JP) .................................. 2011-078872

(51) Int. Cl.
*G06K 9/34* (2006.01)
*G06K 9/40* (2006.01)

(52) U.S. Cl.
USPC .......................................... 382/171; 382/266

(58) Field of Classification Search
None
See application file for complete search history.

(56) References Cited

U.S. PATENT DOCUMENTS

2009/0245679 A1* 10/2009 Ohwaki et al. ................ 382/260
2011/0050934 A1* 3/2011 Mitsunaga ................ 348/222.1

\* cited by examiner

*Primary Examiner* — Amara Abdi
(74) *Attorney, Agent, or Firm* — Sherr & Jiang, PLLC

(57) ABSTRACT

An image processing apparatus, which calculates weight values based on difference values between the pixel values of pixel positions in an image data and the pixel values of pixels of a peripheral region, calculates expectation values of the pixel values of the peripheral region on the basis of weight values calculated for the pixels in the peripheral region, and makes the expectation values the calculation results of the pixel position, includes: a plurality of normalized weighting functions for calculating the weight values; a unit that calculates the total sum of weight of all of pixels in the peripheral region, for the plurality of normalized weighting functions; a unit that selects the normalized weighting functions on the basis of the total sum of the weight values; and a unit that calculates expectation values of the pixel values in the peripheral region based on the selected normalized weighting function.

9 Claims, 33 Drawing Sheets

IMAGE PROCESSING APPARATUS AND METHOD, AND PROGRAM

BACKGROUND

The present technology relates to image processing apparatus and method, and a program, particularly, image processing apparatus and method and a program that make it possible to achieve a sufficient smoothing effect by suppressing deterioration of the image quality of an image.

An edge preserving smoothing process is one of the image processing techniques. The edge preserving smoothing is a nonlinear filter process that smoothes gradation while maintaining an outstanding luminance, such as object boundary in an image. The process has been used for a noise reduction process in the related art, because the process removes a fine luminance change while preserving an object outline that influences visibility (For example, see A. Lev, S. W. Zucker, A. Rosenfeld, "Iterative enhancement of noise images", IEEE Trans. Systems, Man, and Cybernetics, Vol. SMC-7, 1977, D. C. C. Wang, A. H. Vagnucci, C. C. Li, "Gradient inverse weighted smoothing scheme and the evaluation of its performance", CVGIP, Vol. 15, pp. 167-181, 1981 and M. Nagao, T. Matsuyama, "Edge preserving smoothing", CGIP, Vol. 9, pp. 394-407, 1978).

The edge preserving smoothing process is also used for a gradation correction process that compresses the luminance difference of other components without changing detailed components represented as a texture, using the property that can separate a fine luminance change of a texture in an object and an outstanding luminance step of an object outline (for example, see F. Durand, J. Dorsey, "Fast bilateral filtering for the display of high-dynamic-range images", Proc. of ACM SIGGRAPH 2002, 2002 and S. N. Pattanaik, H. Yee, "Adaptive gain control for high dynamic range image display", Proc. of Spring Conference in Computer Graphics 2002, 2002).

A technique called a bilateral filter in the edge preserving smoothing process is frequently used in recent years. In general, a bilateral filter BLF(p) of an image I(p), as expressed in the following Formula (1), performs a calculation of adding a pixel value I(q) around a pixel position p weighted with both a space direction weighting function of $\omega(q-p)$ and a luminance value direction weighting function $\phi(I(q)-I(p))$.

$$BLF(p_c) = \frac{\sum_{p \in \Omega} \omega(p - p_c)\phi(I(p) - I(p_c))I(p)}{\sum_{p \in \Omega} \omega(p - p_c)\phi(I(p) - I(p_c))} \quad (1)$$

The denominator at the right side expresses a normalizing coefficient of a weighted value in Formula (1).

For example, a technique of a gradation correcting process using a bilateral filter is disclosed in "F. Durand, J. Dorsey, "Fast bilateral filtering for the display of high-dynamic-range images", Proc. of ACM SIGGRAPH 2002, 2002". The weighting functional shapes of space direction and luminance direction are optional in the bilateral filter, but a rectangular box function or a bell-shaped normal distribution function are commonly used for image processing.

There is a technique called a $\epsilon$ filter in the edge preserving smoothing process, similar to the bilateral filter, and this is also commonly used. The $\epsilon$ filter may be said as a filter in which the space direction weighting function of the bilateral filter is a box function, that is, as a bilateral filter without weighting that depends on the pixel position. The following Formula (2) is a mathematical expression of the $\epsilon$ filter.

$$\varepsilon F(p_c) = \frac{\sum_{p \in \Omega} \phi(I(p) - I(p_c))I(p)}{\sum_{p \in \Omega} \phi(I(p) - I(p_c))} \quad (2)$$

Both the bilateral filter and the $\epsilon$ filter are techniques of calculating a weighted expectation value based on the difference between the luminance value of a pixel to be smoothed and the luminance value of the pixels around the same, which shows an effect of improving separation of a large step, such as an edge, and an infinitesimal amplitude, such as noise.

SUMMARY

However, there is a problem in that appropriate smoothing is not implemented or an artifact is generated in a pseudo-outline, at an edge with a relatively small gradient or in a gradation region, in the edge preserving smoothing that uses the luminance direction weighting function described above. An example of a one-dimensional signal is described hereafter.

FIGS. 1 and 2 schematically show examples of removing noise of a one-dimensional signal with the noise added to rectangular unevenness, by applying a bilateral filter.

In FIG. 1, a signal before a bilateral filter is applied is indicated by a black dot sequence 11 and an original signal without noise is indicated by a broken line 12. In order to apply the bilateral filter to a signal at a pixel position 13, it is preferable to dispose the center of a space direction weighting function 14 to the position, dispose the center of a luminance direction weighting function 15 to fit the luminance value of the pixel, and then calculate Formula (1).

In this process, the pixel signal in a rectangular region 16 defined by the widths of the space and luminance direction weighting functions is reflected to smoothing. The pixel is not reflected to smoothing unless it is in the range of the weighting function in the luminance direction even if it is spatially in the range of the weighting function.

Therefore, for the pixel position 13, a weighted expectation value is obtained even only from the pixel at the left side of a signal step, except for the pixel at the right side of the signal step, such that it is possible to achieve a processing result close to the original signal without noise.

It is possible to obtain a signal close to an ideal shown in FIG. 2, where a bilateral filter is applied to the entire signal, by the property of the bilateral filter which separates and smoothes the signals at both sides of the step, even around the signal step.

Next, FIGS. 3 and 4 schematically show an example of applying a bilateral filter to a one-dimensional signal with noise added to trapezoidal unevenness having a smaller gradient than the rectangular step.

Similar to FIG. 1, a signal before a bilateral filter is applied is indicated by a black dot sequence 31 and an original signal without noise is indicated by a broken line 32. Further, the positions of a space direction weighting function 34 and a luminance direction weighting function 35 when a bilateral filter is applied to the signal of a pixel position 33 are shown.

Similar to FIG. 1, the pixel in a rectangular region 36 defined by the space direction and luminance direction weighing functions is reflected to a weighted expectation value of the pixel position 33. However, in this example, since the step has a gradient, which is not steep but smooth, the pixel 33 is at the middle of the gradient of the step.

Basically, it is ideal that the luminance value around the middle of the gradient be calculated from the weighted expectation value of a peripheral pixel, but in the example, the expectation value of a peripheral pixel biased to a lower luminance than the pixel by the weighting function is calculated, such that a value lower than that of the original signal is output.

Similarly, even at other positions of the gradients, an expectation value biased to the luminance of a flat portion is calculated by selecting pixels close to the flat portion by a weighting function, and as a result, a signal with steeper gradients different from the gradient of the original steps is obtained, as shown in FIG. 4.

This problem is caused because the luminance range is limited too much by the luminance direction weighting function of the bilateral filter. For example, as shown in FIG. 5, when a wider luminance direction weighting function 51 is applied to the signal shown in FIG. 3, the pixel on the gradient of the step is sufficiently smoothed, such that a signal with a gradient close to the original step can be achieved, as shown in FIG. 6.

However, when the luminance direction weighting function having the width is applied to the initial signal with rectangular steps shown in FIG. 1, the property of separating the steps is small, such that the shoulders of the originally steep steps lose the edges.

Other problems relating to the width of the luminance direction weighting function are described with reference to FIGS. 7 and 8.

FIG. 7 schematically shows an example of applying a bilateral filter to a one-dimensional signal with noise added to a smoothly changing gradient.

Similar to FIG. 1, a signal before a bilateral filter is applied is indicated by a black dot sequence 71 and an original signal without noise is indicated by a broken line 72. The left end of an original signal 72 without noise has a relatively steep gradient, but the gradient becomes smooth to the right.

Further, a space direction weighting function 75 and a luminance direction weighting function 76 at a pixel position 73 with a steep gradient around the left end of the signal, a region 77 contributing to the weighted expectation value defined by the weighting functions, a space direction weighting function 78 and a luminance direction weighting function 79 at a position 74 with a smooth gradient around the right end of the signal, and a region 80 contributing to the weighted expectation value defined by the weighting functions are shown.

Comparing the contribution regions 77 and 80 at two positions, there are clearly less contributable pixels at the position with a steep gradient around the left end. As a result, as shown in FIG. 8, there is a problem in the region with a steep gradient in that the smoothing effect, that is, the effect of reducing the noise of the bilateral filter decreases in comparison to the region with a smooth gradient.

As described above, the appropriate width of a luminance direction weighting function depends on the image. Using a bilateral filter for reducing noise causes problems of an effect of noise reduction and trade-off of edge preserving performance. It is preferable to set the width of a luminance direction weighting function to be small in order to maintain the original edges, but the effect of noise reduction of the weighting function with a small width changes with a change in smooth gradient.

Further, when a bilateral filter is used for gradation correction, the bilateral filter is used for a process of separating a component showing the general structure of an image (hereafter, the general luminance component) and a component showing a local structure, such as a texture, (hereafter, a local contrast component).

When the gradient of an edge portion is not appropriately separated into the components, an unnatural artifact is generated.

For the steps of the edge in the examples described above, a luminance weighting function with too small a width causes an artifact in solarization or a pseudo-outline, whereas too large a width causes an artifact in a halo or overshoot shape, such that both too small and large widths cause a problem.

It is necessary to appropriately control the width of a luminance weighting function in accordance with the image in order to avoid the problem.

As described above, there is a problem in that appropriate smoothing is not implemented or an artifact is generated in a pseudo-outline, at an edge with a relatively small inclination or in a gradation region, in the edge preserving smoothing that uses a luminance axis weighting function, such as a bilateral filter or a ε filter.

It is desirable to suppress deterioration of the image quality of an image and achieve a sufficient smoothing effect.

The present technology solves the problems described above with the following configurations.

According to an embodiment of the present technology, there is provided an image processing apparatus that calculates weight values based on difference values between the pixel values of pixel positions in an image data and the pixel values of pixels of a peripheral region (for example, the configuration until the space weight calculation unit 105 and the luminance weight calculation unit 106 of FIG. 10), calculates expectation values of the pixel values of the peripheral region on the basis of weight values calculated for the pixels in the peripheral region, and makes the expectation values the calculation results of the pixel position (the configuration of the product-sum unit 107, the product-sum unit 108, and the latter), the image processing apparatus includes: a plurality of normalized weighting functions (space weighting function set 131 and luminance weighting function set 132) for calculating the weight values, a unit (space weight calculation unit 105, luminance weight calculation unit 106, product-sum unit 107, product-sum unit 108, luminance integration value store 133 storing the result, and weight integration value store 134) that calculates the total sum of weight value of all of pixels in the peripheral region, for the plurality of normalized weighting functions, a unit (integration value selection unit 135) that selects the normalized weighting functions on the basis of the total sum of the weight values; and a unit (division unit 109) that calculates expectation values of the pixel values in the peripheral region based on the selected normalized weighting function.

Further, the unit that selects a normalized weighting function may select a normalized weighting function making the total sum of the weight values the maximum (for example, the configuration of FIG. 11).

Further, the unit that selects a normalized weighting function may extract the maximum value of the total sum of the weight values and values within a predetermined allowable width from the maximum value, and select a function with the maximum function width from the normalized weighting functions corresponding to the total sum of the extracted weight values (for example, the configuration of FIG. 12).

An image processing apparatus according to another embodiment of the present technology, in an image processing (for example, the configuration of FIG. 13) including: a block histogram calculation unit that calculates a frequency value (block histogram) of a pixel of each of bins dividing an image into a plurality of luminance ranges in the luminance direction, for each of blocks dividing the image into a plurality of regions in the space direction; a characteristic value calculation unit that calculates or set a characteristic value for each bin of a block histogram; and a unit that calculates a weighted expectation value of a characteristic value for each pixel of an image on the basis of frequency values and characteristic values of the bins, the unit that calculates a weighted expectation value of the characteristic value includes: a plurality of normalized weighting functions (for example, the space weighting function set 281 and the luminance weighting function 282 of FIG. 15) for calculating the weight values; a unit (product-sum unit 259) that calculates a frequency expectation value of the pixel, for each of the plurality of normalized weighting functions; a unit (frequency expectation value selection unit 285) that selects the normalized weighting function on the basis of the frequency expectation value; and a unit (the configuration of product-sum unit 258, and from product-sum unit 259 to division unit 260) that calculates a weighted expectation value of a characteristic value of the pixel based on the selected normalized weighting function.

Further, the unit that selects a normalized weighting function may select a normalized weighting function making the frequency expectation value the maximum (for example, the configuration of FIG. 11).

Further, the unit that selects a normalized weighting function may extract the maximum value of frequency expectation values and values within a predetermined allowable width from the maximum value, and select a function with the maximum function width from the normalized weighting functions corresponding to the extracted frequency expectation value (for example, the configuration of FIG. 12).

Further, the characteristic value of each bin may be a value representing the luminance of pixels pertaining to the bin.

Further, the characteristic value of each bin may be a value representing the chromaticity of pixels pertaining to the bin.

An image processing apparatus according to another embodiment of the present technology, in image processing (for example, the configuration of FIG. 16) including: a block histogram calculation unit that calculates a frequency value (block histogram) of a pixel of each of bins dividing an image into a plurality of luminance ranges in the luminance direction, for each of blocks dividing the image into a plurality of regions in the space direction; a characteristic value calculation unit that calculates or set a characteristic value for each bin of a block histogram; a first convolution unit that convolutes a weighting function for the frequency value; a second convolution unit that convolutes a weighting function for (the characteristic value×the frequency value); a unit that calculates an interpolation value of the result of the first convolution unit, which corresponds to the luminance value of each pixel of the image; a unit that calculates a interpolation value of the result of the second convolution unit, which corresponds to the luminance value of each pixel of the image; and a unit that calculates a weighted expectation value of the characteristic value corresponding to the luminance value of each pixel of the image by dividing the first interpolation value by the second interpolation value, the first convolution unit includes: a plurality of normalized weighting functions (for example, the space weighting function set 381 and the luminance weighting function set 382 of FIG. 18); a unit (product-sum unit 360) that calculates a convolution result for each bin of the frequency value, for each of the plurality of normalized weighting functions; and a unit (frequency expectation value selection unit 385) that selects the normalized weighting function and the convolution result of a corresponding frequency value on the basis of the convolution result of the frequency value, and the second convolution unit includes: a plurality of normalized weighting functions (the space weighting function set 381 and the luminance weighting function set 382); a unit (product-sum unit 360) that calculates a convolution result for each bin of the frequency value, for each of the plurality of normalized weighting functions; and a unit (product-sum unit 359) that calculates a convolution result for each bin of (the characteristic value× the frequency value), for each of the plurality of normalized weighting functions; and a unit (frequency expectation value selection unit 385) that selects the normalized weighting function and a corresponding convolution result of (characteristic value×frequency value) on the basis of the convolution result of the frequency value.

Further, the unit that selects a normalized weighting function may select a normalized weighting function making the frequency expectation value the maximum (for example, the configuration of FIG. 11).

Further, the unit that selects a normalized weighting function may extract the maximum value of frequency expectation values and values within a predetermined allowable width from the maximum value, and select a function with the maximum function width from the normalized weighting functions corresponding to the extracted frequency expectation value (for example, the configuration of FIG. 12).

Further, the characteristic value of each bin may be a value representing the luminance of pixels pertaining to the bin.

Further, the characteristic value of each bin may be a value representing the chromaticity of pixels pertaining to the bin.

According to an embodiment of the present technology, it is possible to suppress deterioration of the image quality of an image and achieve a sufficient smoothing effect.

DETAILED DESCRIPTION OF EMBODIMENTS

Embodiments where the present technology is applied are described hereafter with reference to the drawings.
Operation and Effect of the Technology The present technology relates to image processing that extracts the general structure of image data, or an image processing apparatus. The technology can be used to improve an image quality, using extracted information, and is applied to signal processing in an imaging apparatus, such as a video camera or a digital camera, or in an image display device, such as a printer or a display, or to an apparatus for processing/editing an image or a computer program.

How the present technology is used and the problems described above are solved is described first.

In detail, in the present technology, the weight value of each pixel in a local region is calculated by using a plurality of normalized luminance axis weighting functions having different extents ($\sigma$). The result of edge preserving smoothing by a luminance axis weighting function where the total sum of the weight values is the largest is selected.

Figure 1:
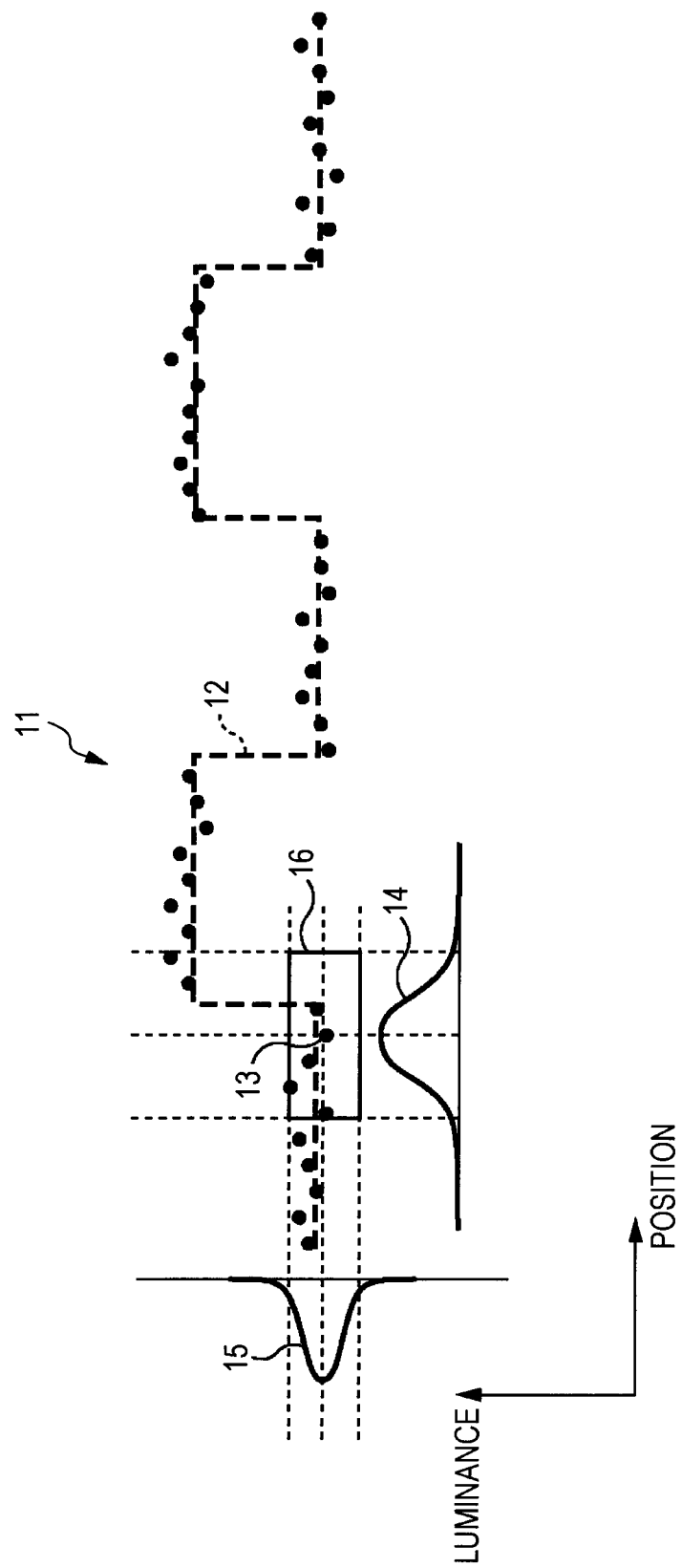
FIG. 1 is a diagram showing when a bilateral filter is applied to a signal having a rectangular shape including noise.
Figure 2:
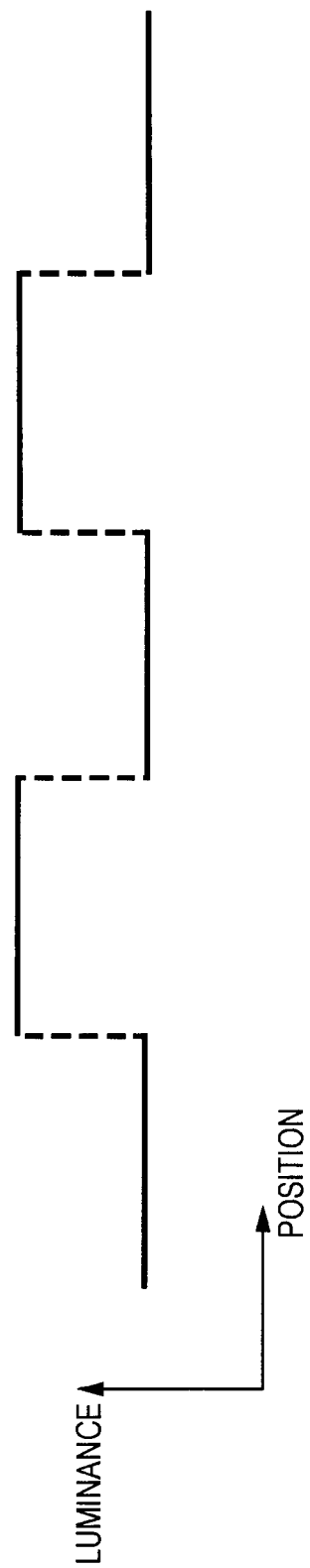
FIG. 2 is a diagram showing the result of applying a bilateral filter to the signal having a rectangular shape including noise.
Figure 3:
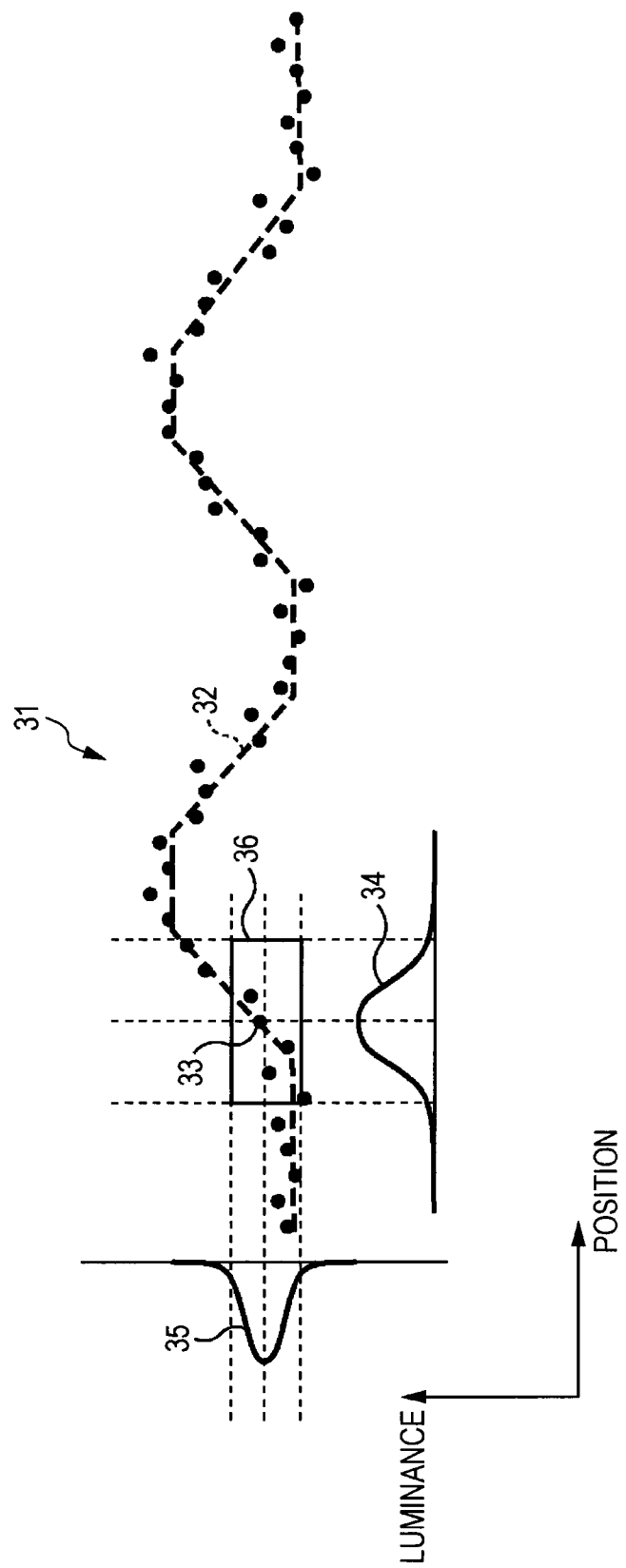
FIG. 3 is a diagram showing when a bilateral filter is applied to a signal having a trapezoidal shape including noise.
Figure 4:
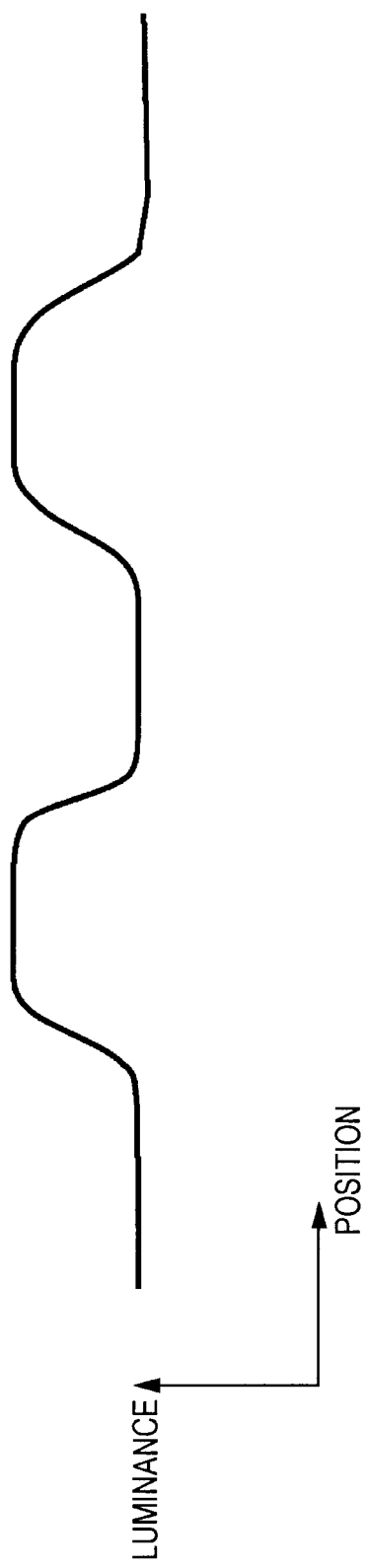
FIG. 4 is a diagram showing the result of applying a bilateral filter to the signal having a trapezoidal shape including noise.
Figure 5:
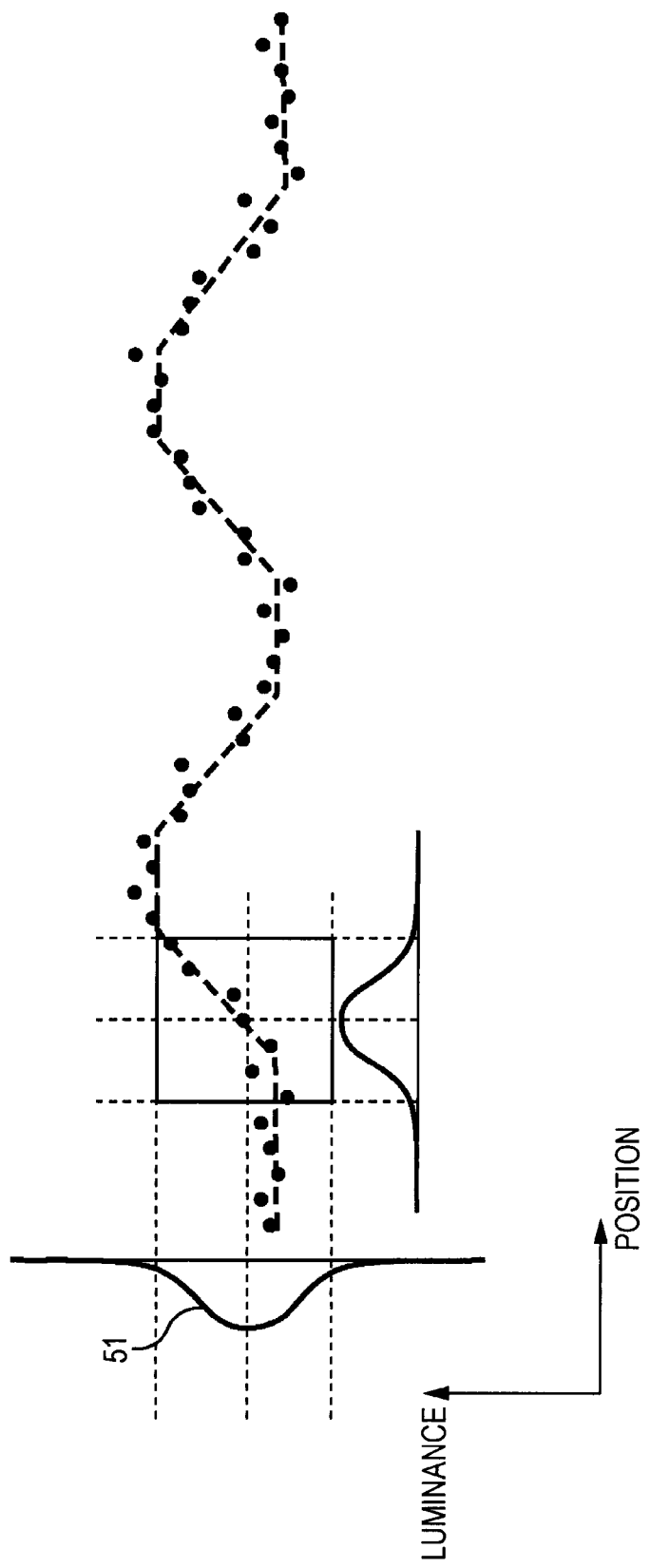
FIG. 5 is a diagram showing when a bilateral filter is applied to a signal having a trapezoidal shape including noise.
Figure 6:
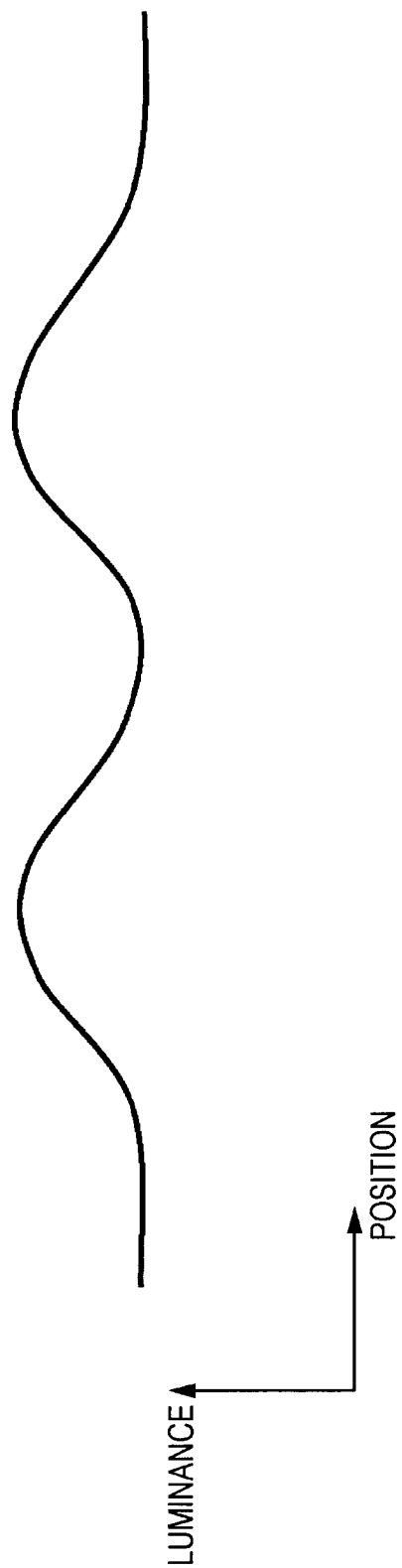
FIG. 6 is a diagram showing the result of applying a bilateral filter to the signal having a trapezoidal shape including noise.
Figure 7:
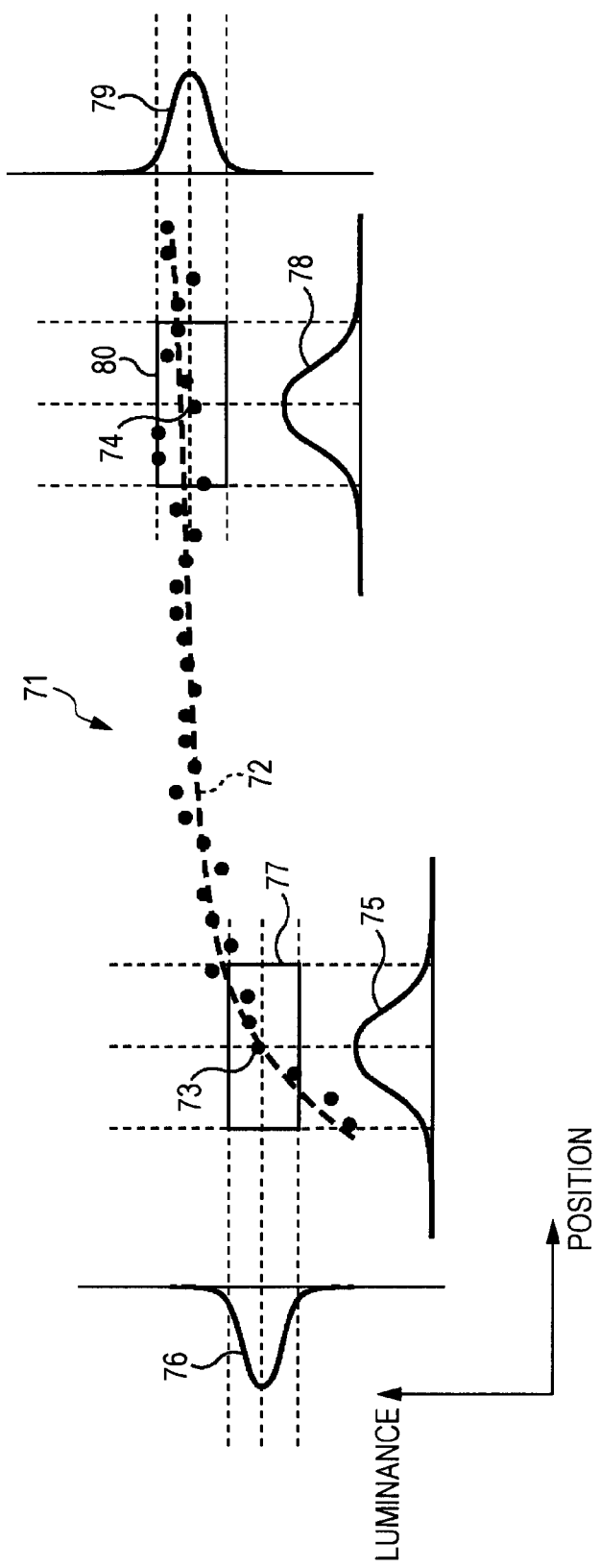
FIG. 7 is a diagram showing when a bilateral filter is applied to a signal having a smooth gradient including noise.
Figure 8:
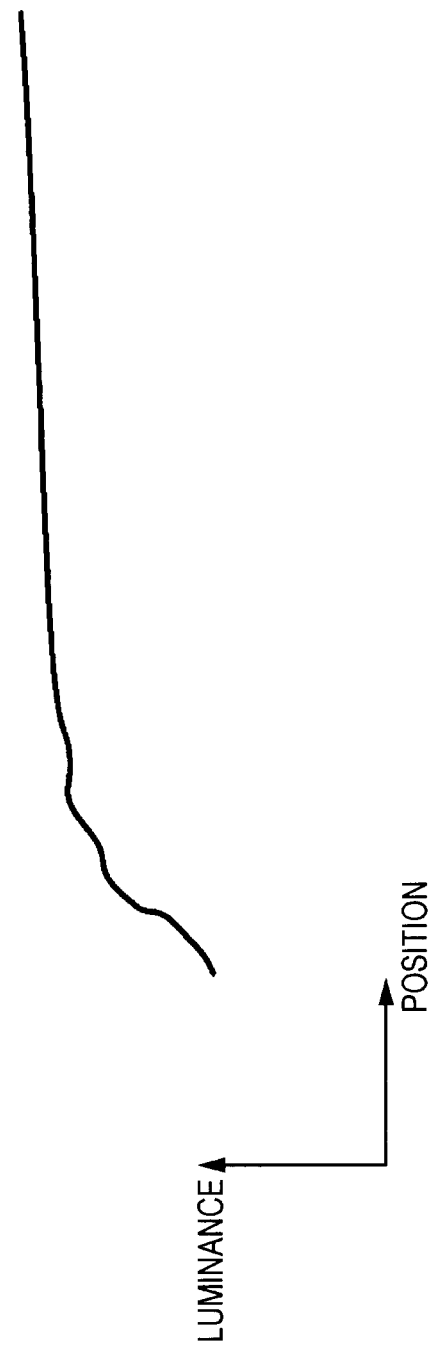
FIG. 8 is a diagram showing the result of applying a bilateral filter to the signal having a smooth gradient including noise.
Figure 9:
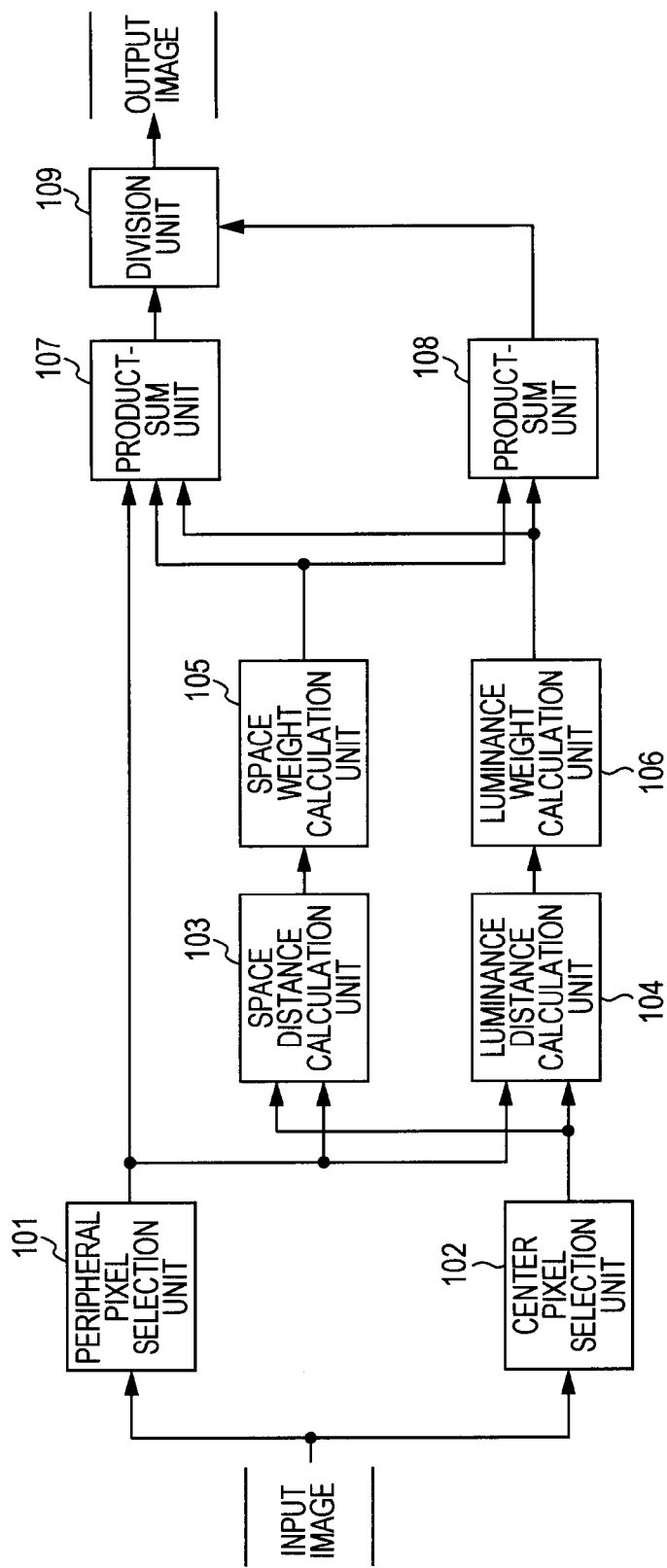
FIG. 9 is a block diagram showing the processing configuration of a bilateral filter.

FIG. 9 shows an example of a process block configuration that implementing a bilateral filter process expressed by Formula (1) described above. Problems of an effect of noise reduction and trade-off of preserving performance, as described above, are generated in the bilateral filter implemented by the configuration.

Figure 10:
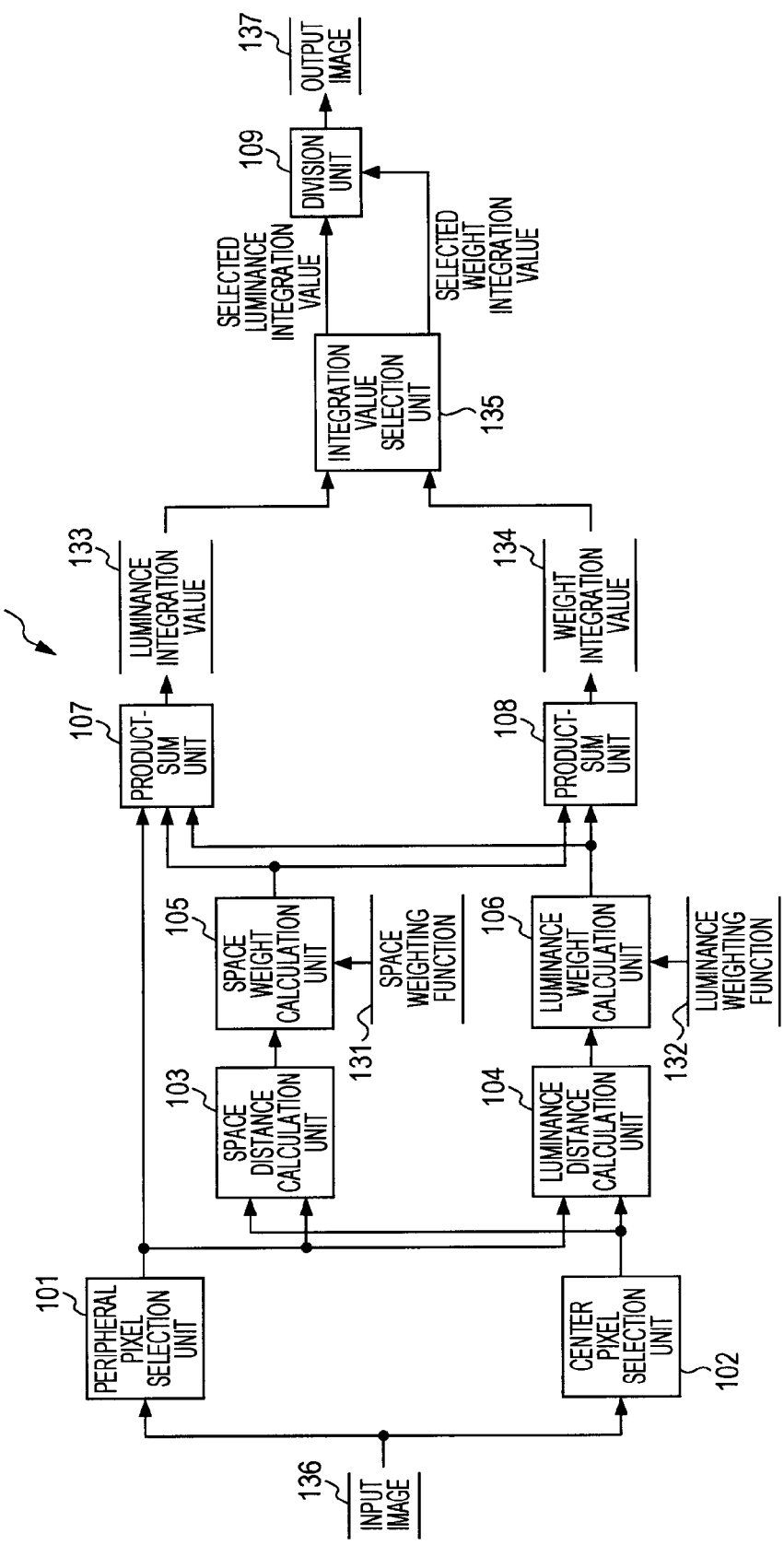
FIG. 10 is a block diagram showing the processing configuration of a bilateral filter.

The process block configuration of a bilateral filter using the present technology is shown in FIG. 10. According the present technology, a plurality of space and luminance direction weighting functions (space weighting function set 131 and luminance weighting function set 132 in FIG. 10) which are used for weighting each peripheral pixel value is provided and a mechanism (integration value selection unit 135) that selects the optimal one from the result calculated by using the weighting functions on the basis of the total sum of the weight values is provided, such that it is possible to optimize the weighting functions for each pixel position in accordance with peripheral images. Therefore, the trade-off described above is attenuated and a very suitable result in comparison to the related art can be achieved.

Figure 11:
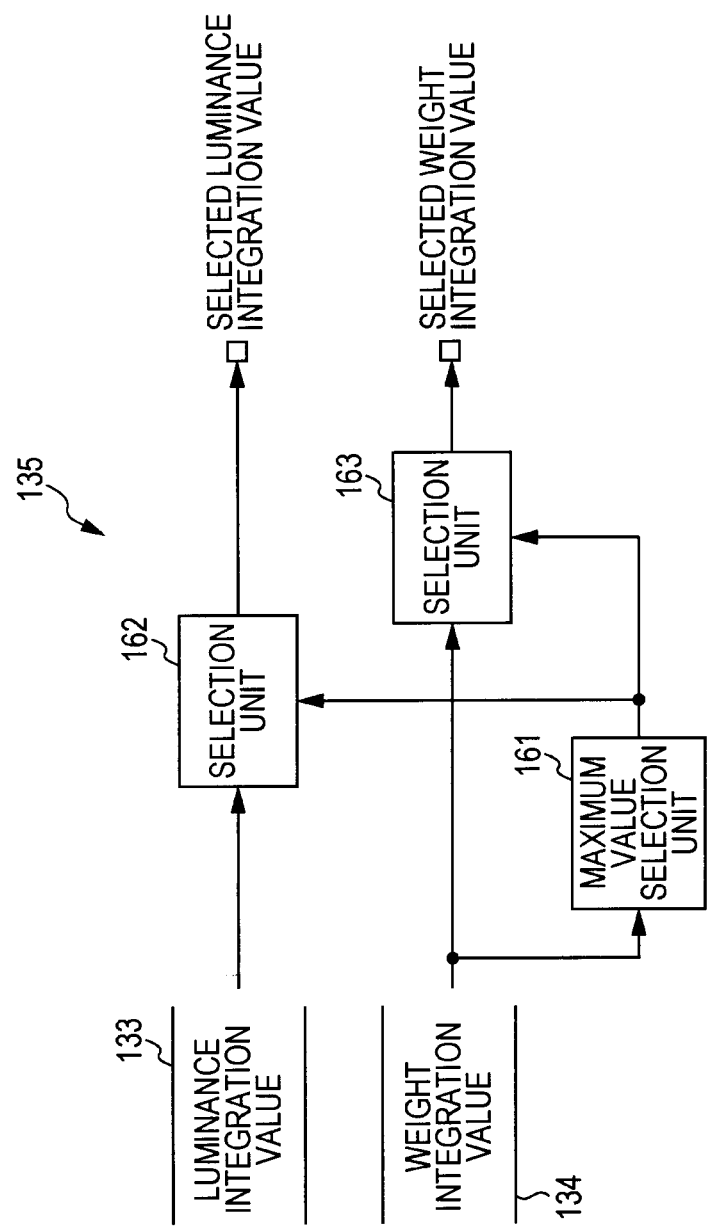
FIG. 11 is a block diagram illustrating the internal configuration of an integration value selection unit.

Further, the present technology provides a reference for selecting an increase as large as possible in the total sum of the weight values, as a detailed reference for selecting the optimal one from the result calculated by using the weighting functions on the basis of the total sum of the weight values, and a mechanism for calculating the reference (configuration in FIG. 11).

Since the weighting functions used in the present technology are normalized such that the integration values become the same, a function with a small width is likely to be selected when the gradient of steps in an image is steep, such that the smoothing effect decreases and thus the steps are likely to remain steep. On the contrary, a function with a large width is likely to be selected when the gradient is smooth, such that smoothing increases, and accordingly, it is possible to suppress steeper steps than the original image from being output.

Figure 12:
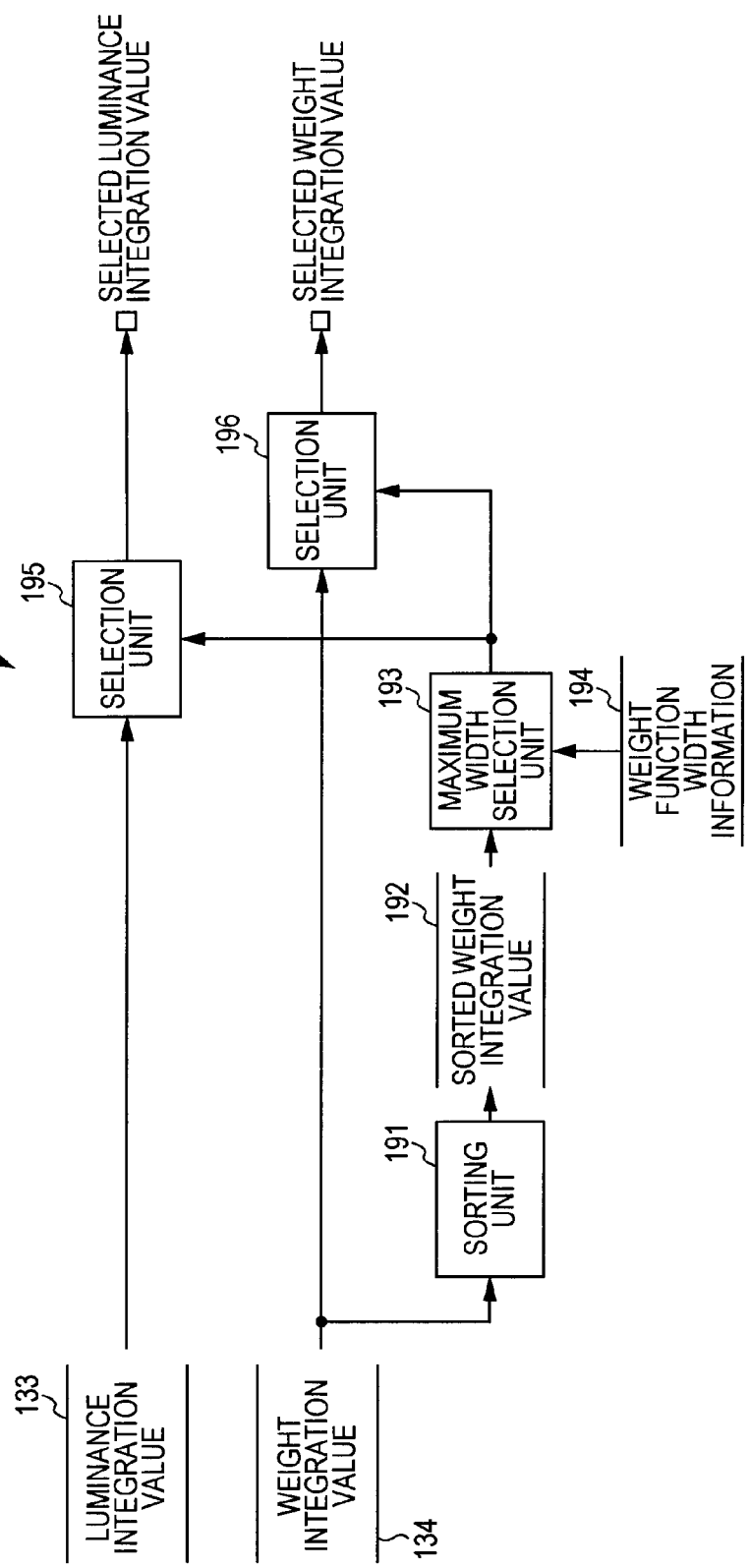
FIG. 12 is a block diagram illustrating a second internal configuration of the integration value selection unit.

Further, the present technology provides a reference for selecting a function with the maximum width from the functions calculated with a large total sum of the weight values, as a detailed reference for selecting the optimal one from the result calculated by using the weighting functions on the basis of the total sum of the weight values, and a mechanism for calculating the reference (configuration in FIG. 12).

For example, when the total sums of the weight values are all the same in weighting functions normalized for an image with continuous smooth gradients at a substantially constant level, according to the reference, it is possible to achieve a smoothing result higher than when the weighting function with the maximum width is selected. There is little possibility that steep gradients continue, such that a side effect of selecting the weighting functions with the maximum width is very small.

Figure 13:
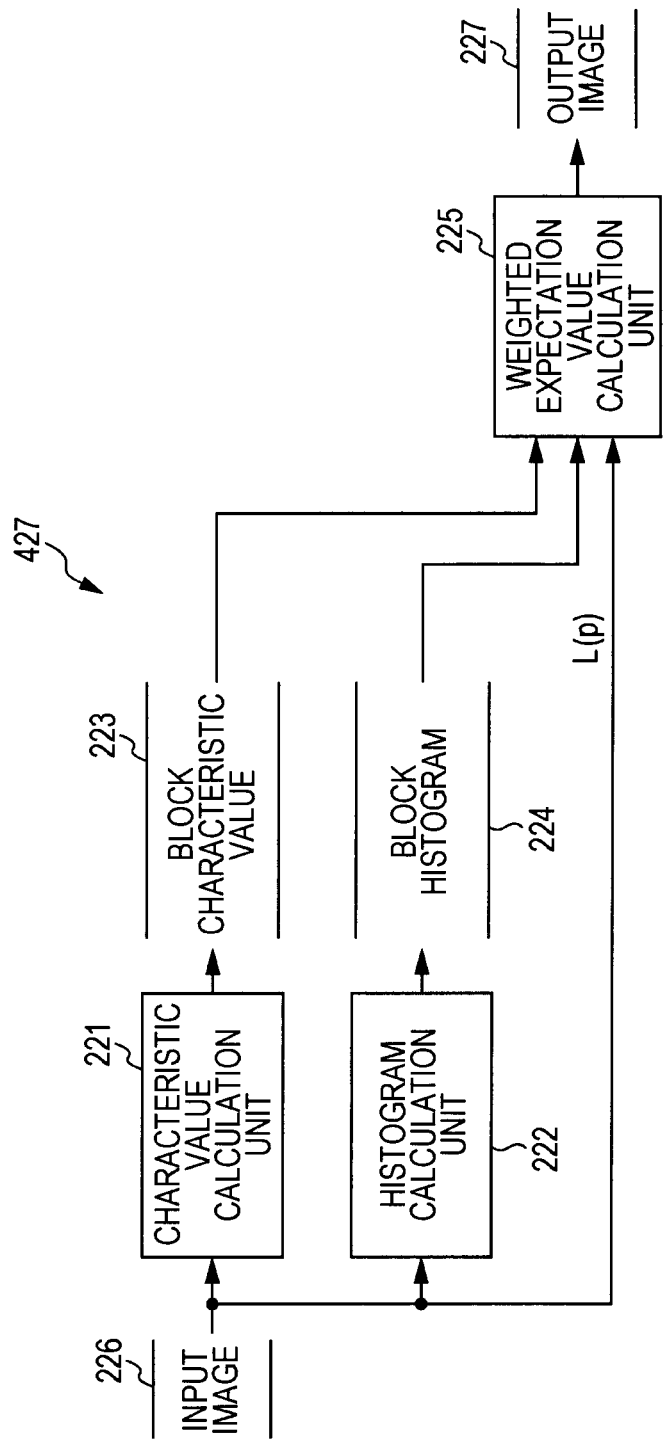
FIG. 13 is a block diagram illustrating the processing configuration of edge preserving smoothing that uses a block histogram.

Further, the present technology provides a configuration for achieving the same effect even for edge preserving smoothing by a second type. FIG. 13 shows a process block configuration of edge preserving smoothing in a different way from the bilateral filter disclosed in Japanese Unexamined Patent Application Publication No. 2009-177558. According to this configuration, a histogram for each block (block histogram) separating an image is calculated, as a pre-process, (characteristic value calculation unit 221 and histogram calculation unit 222), such that it is possible to avoid calculation for each of a plurality of peripheral pixels for each pixel position with a bilateral filter, by using the histograms, in calculation for each pixel, (weighted expectation value calculation unit 225).

Figure 14:
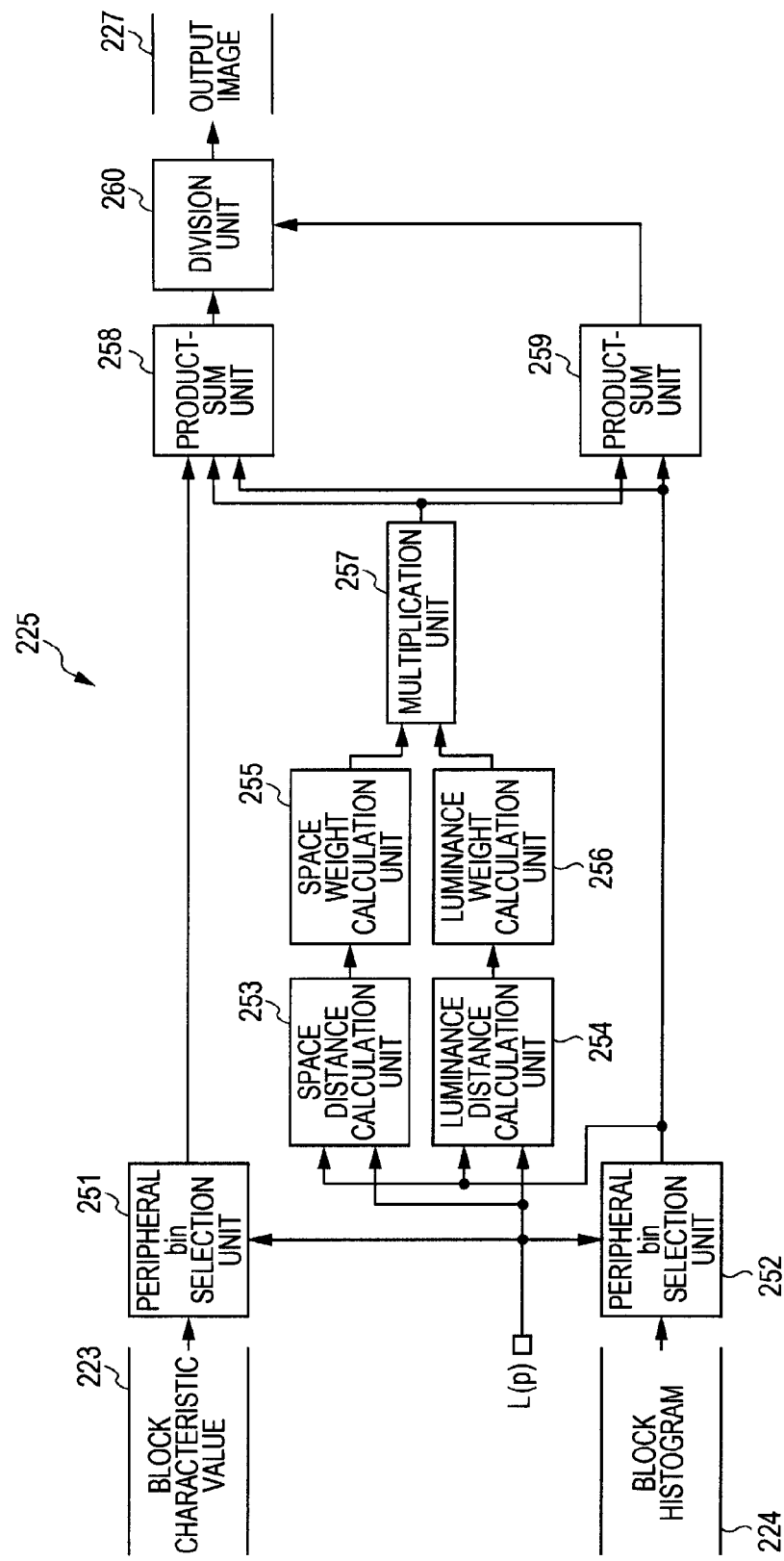
FIG. 14 is a block diagram illustrating the internal configuration of a weighted expectation value calculation unit.

FIG. 14 shows a processing configuration that performs calculation for each pixel (the internal configuration of the weighted expectation value calculating unit 225 of FIG. 13). Unlike the calculation for each peripheral pixel of the bilateral filter, the weight value is calculated for each peripheral bin of the histogram and weighted expectation values based on the calculation are calculated.

Figure 15:
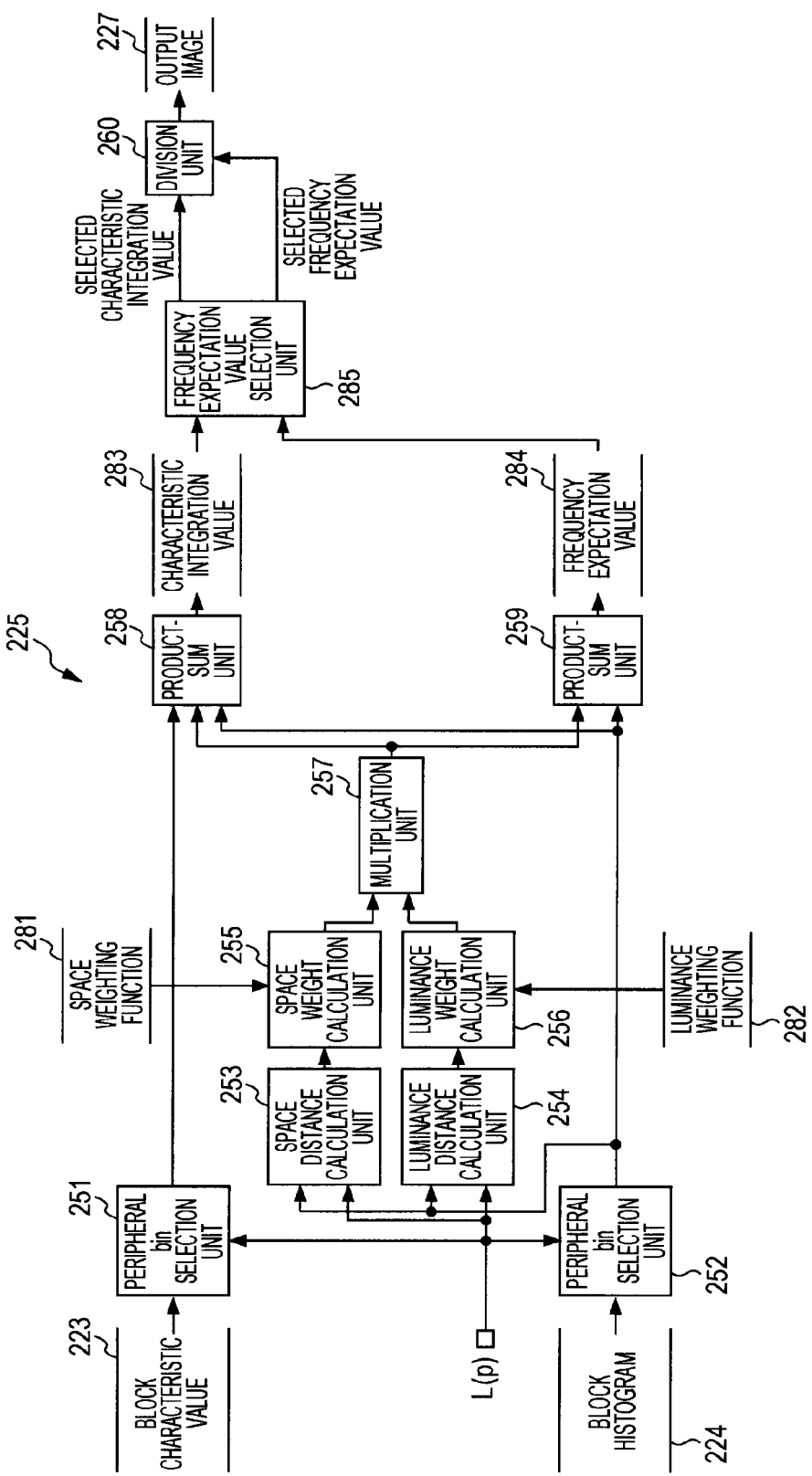
FIG. 15 is a block diagram illustrating the internal configuration of the weighted expectation value calculation unit.

A process block configuration using the present technology for calculation for each pixel in the same edge preserving smoothing is shown in FIG. 15. According the present technology, a plurality of space and luminance direction weighting functions (space weighting function set 281 and luminance weighting function set 282 in FIG. 15) which are used for weighting each peripheral bin is provided and a mechanism (frequency expectation value selection unit 285) that selects the optimal one from the result calculated by using the weighting functions on the basis of a frequency expectation value of the histogram is provided, such that it is possible to optimize the weighting functions for each pixel position in accordance with peripheral bins. Therefore, the trade-off described above is attenuated and a very suitable result in comparison to the related art can be achieved.

Figure 16:
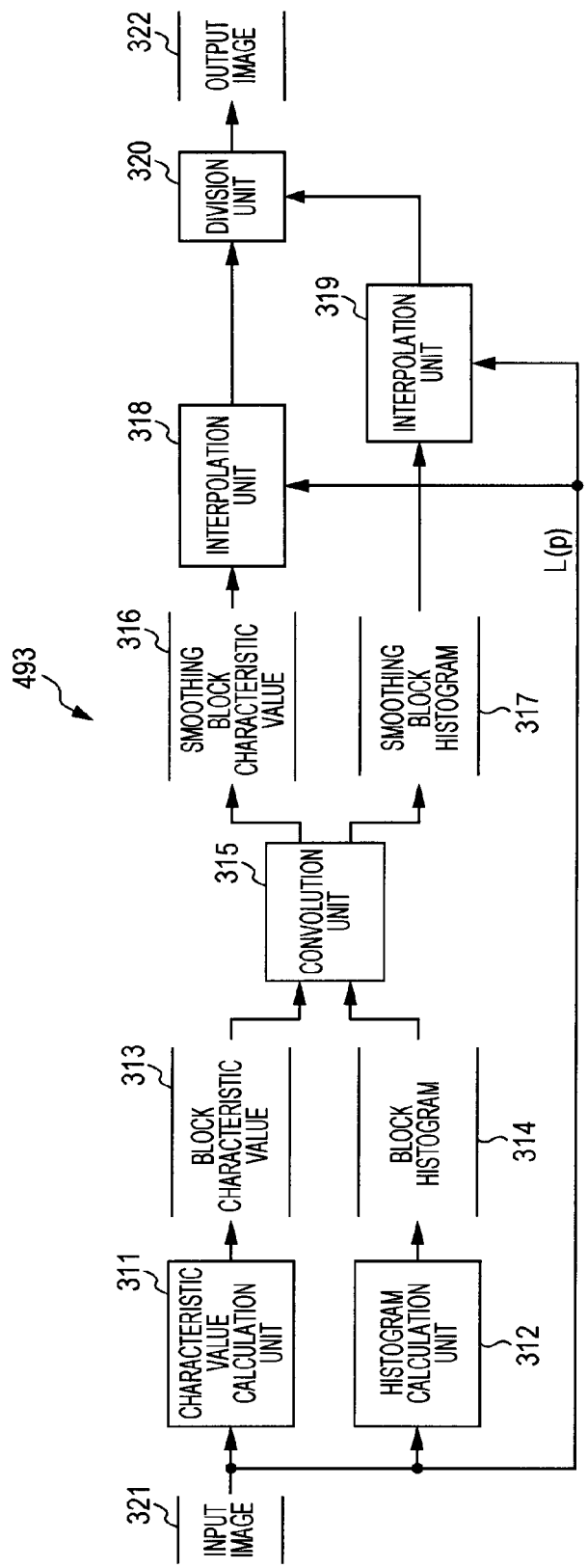
FIG. 16 is a block diagram illustrating the processing configuration of edge preserving smoothing that further simplifies calculation by using a block histogram.

Further, the present technology provides a configuration for achieving the same effect even for edge preserving smoothing by a third type. FIG. 16 shows a process block configuration of edge preserving smoothing of another type disclosed in Japanese Unexamined Patent Application Publication No. 2009-177558.

According to this configuration, a histogram for each block (block histogram) separating an image is calculated (characteristic value calculation unit 311 and histogram calculation unit 312) and space and luminance direction functions are convoluted to the calculated result (convolution unit 315), which are performed as pre-processes.

In calculation for each pixel, the result of edge preserving smoothing is output by (interpolation unit 318, interpolation unit 319, and division unit 320) calculating interpolation values corresponding to the pixel positions, by using the convolution result (smoothing block characteristic value 316 and smoothing block histogram 317).

Figure 17:
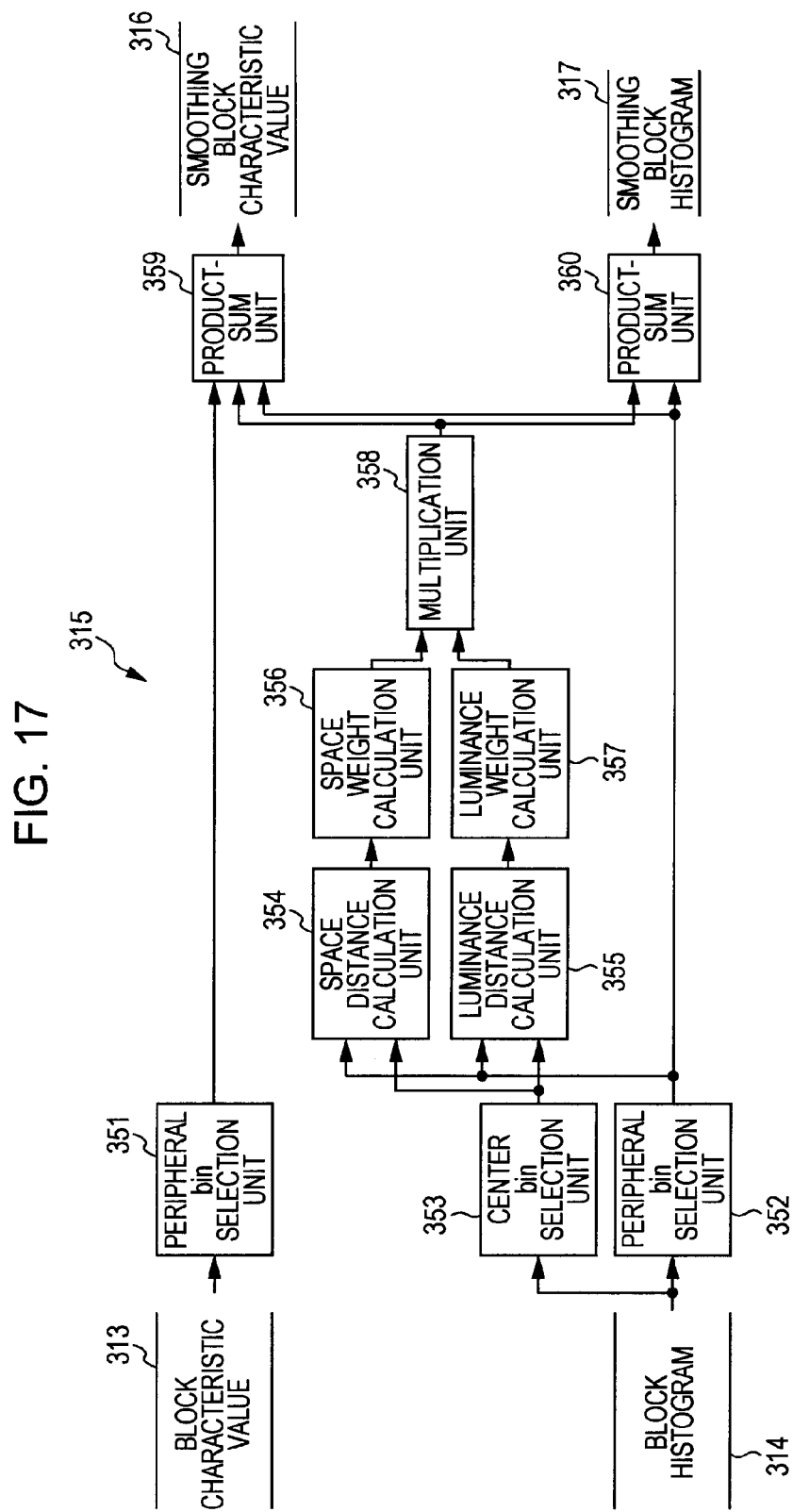
FIG. 17 is a block diagram illustrating the internal configuration of a convolution unit.

FIG. 17 shows a processing configuration for convolution calculation for each bin (internal configuration of the convolution unit 315 of FIG. 16). In order to calculate the smoothing result of the histogram for each bin position where convolution is performed, the weight value for each peripheral bin of the bin is calculated (configuration by a space weight calculation unit 356, a luminance weight calculation unit 357, and a multiplication unit 358) and the values of the peripheral bins are product-summed by using the weight values (product-sum unit 359 and product-sum unit 360).

Figure 18:
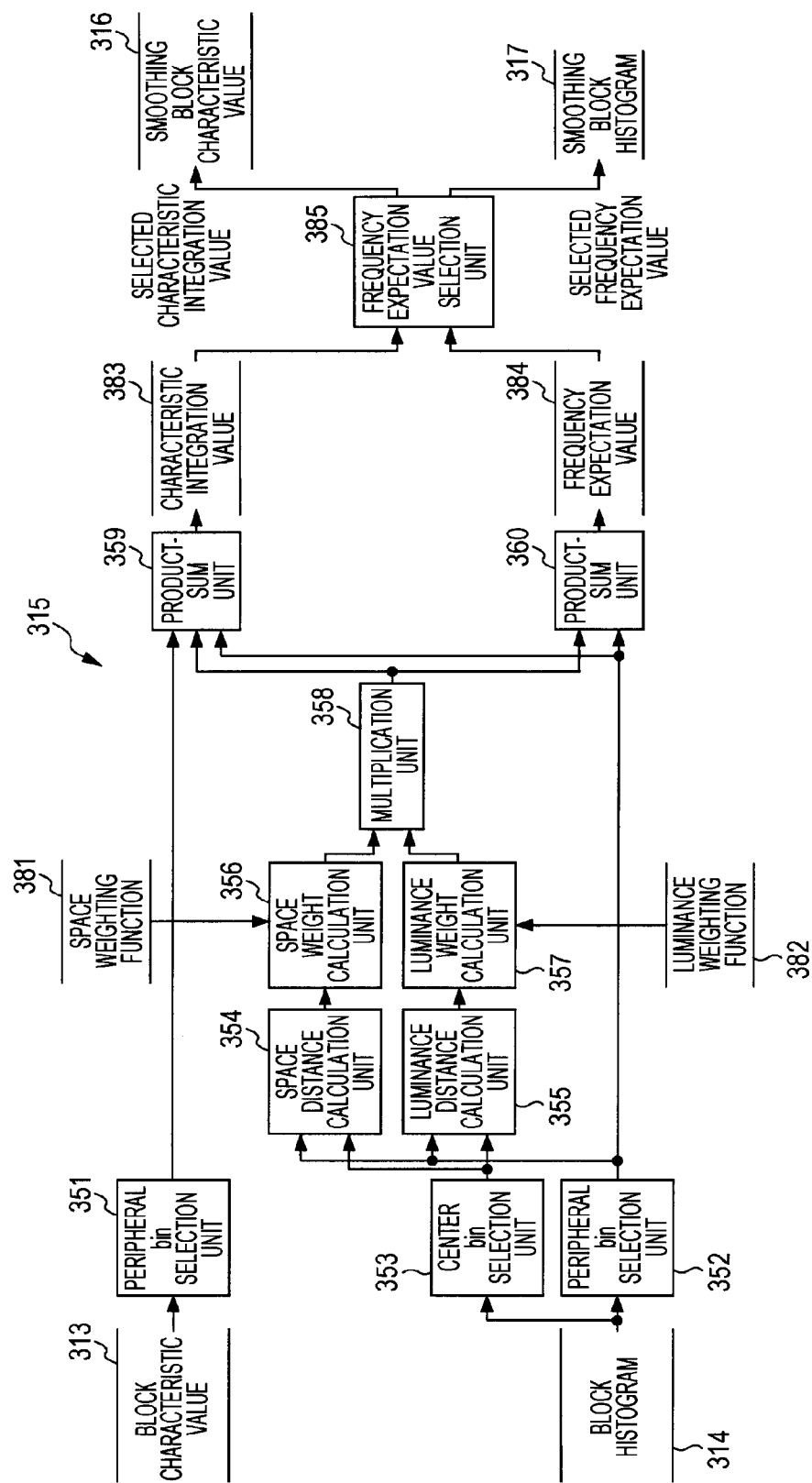
FIG. 18 is a block diagram illustrating the internal configuration of the convolution unit.

A process block configuration using the present technology for calculation for each pixel in the same edge preserving smoothing is shown in FIG. 18. According the present technology, a plurality of space and luminance direction weighting functions (space weighting function set 381 and luminance weighting function set 382 in FIG. 18) which are used for weighting each peripheral bin is provided and a mechanism (frequency expectation value selection unit 385) that selects the optimal one from the result calculated by using the weighting functions on the basis of a frequency expectation value of the histogram is provided, such that it is possible to optimize the weighting functions for each bin position in accordance with peripheral bins. Therefore, the trade-off described above is attenuated and a very suitable result in comparison to the related art can be achieved.

Further, in the edge preserving smoothing of the second and third types using the present technology, it is possible to perform edge preserving smoothing on the luminance by using a value representing the luminance of the pixel pertaining to each bin, as a detailed characteristic value calculated for each bin of the block histogram. The value representing the luminance may be, in detail, an expectation value or a median value of the luminance pertaining to each bin, or a value corresponding to the center of each bin based on the dividing method in the luminance direction of the block histogram.

Further, an input image in the present technology may be a multi-channel image in which various characteristic values are organized in a plurality of channels. A color image is a typical multi-channel image. When a color image is input, edge preserving smoothing of chromaticity is possible by using a value representing the chromaticity of the pixel pertaining to each bin, as a detailed characteristic value calculated for each bin of the block histogram. The value representing chromaticity may be, in detail, a value having a spectroscopic property different from luminance in the channels (colors) that the image retains, a color different component after the multi-channel image is converted into a luminance-color difference space, or the saturation degree and a color component after the multi-channel image is converted into a saturation degree-color space, such that the expectation value or the median value for each bin may be used.

Entire System of Embodiment

Embodiments of the present technology are described hereafter. The embodiments described herein are examples of a digital video camera with the present technology mounted therein. The configuration and operation of the entire system are described first and then camera signal processing closely connected with the present technology.

Figure 19:
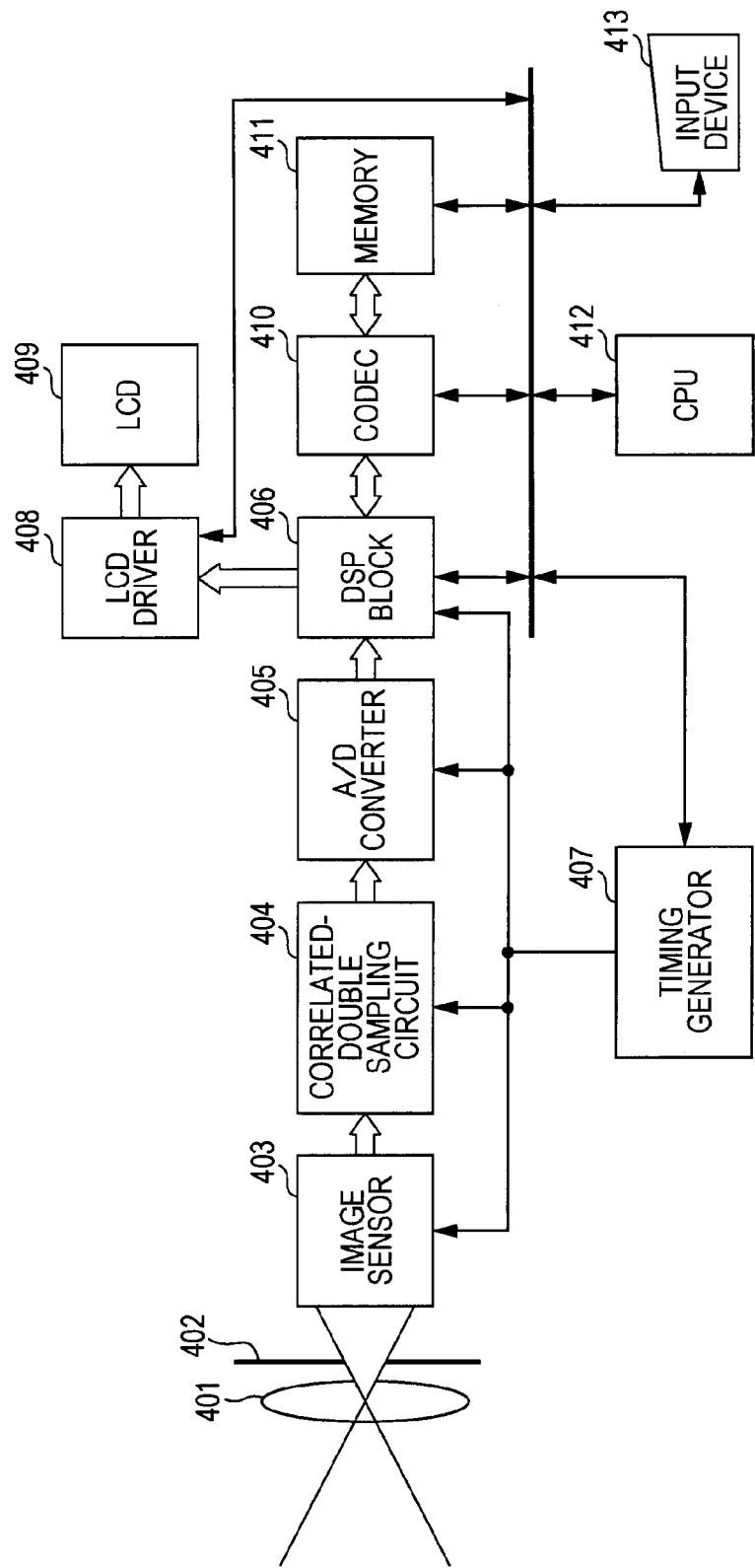
FIG. 19 is a block diagram of a digital video camera system.

FIG. 19 is a block diagram showing the configuration of a digital video camera system according to the embodiment.

As shown in FIG. 19, a digital video camera system according to the embodiment includes a lens 401, a diaphragm 402, an image sensor 403, a correlated-double sampling circuit 404, an A/D (Analog/Digital) converter 405, a DSP (Digital Signal Processor) block 406, a timing generator 407, an LCD (Liquid Crystal Display) driver 408, an LCD 409, a CODEC 410, a memory 411, a CPU (Central Processing Unit) 412, and an input device 413.

In this configuration, the input device 413 is an operation button or the like, such as the shutter button in a camera main body. Further, the DSP block 406 is a block having a processor for processing a signal and a RAM (Random Access Memory) for an image, in which the processor for processing a signal can perform image processing programmed in advance for image data stored on the RAM for an image. The DSP block 406 is also called simply a DSP 406 hereafter.

The entire operation of the embodiment is described hereafter.

Incident light reaching the image sensor 403 through an optical system reaches each light receiving elements on a sensor-imaging surface, an electric signal is converted by photoelectric conversion in the light receiving elements, noise is removed by the correlated-double sampling circuit 404, the signal is digitized by the A/D converter 405 and then temporarily stored in the image memory in the DSP 406.

The image sensor 403 used in the embodiment has a dynamic range wider than common image sensors, such that it can image without noise or saturation from the dark portion to the bright portion. Therefore, A/D conversion with generally 10 to 12 bits in the A/D converter 405 is performed, for example, with 14 to 16 bits in the embodiment.

An image signal with many gradations is not reproduced in a common video signal, such as YCrCb, but the gradations are compressed into a range where the signal can be reproduced into YCrCb by a gradation correction process using the present technology, which is described below.

For the state during imaging, the timing generator 407 controls a signal processing system to maintain image reading-out by a constant frame rate. A pixel stream is also sent at a constant rate to the DSP 406 and appropriate image processing is performed therein, and then the image data is sent to the LCD driver 408 or the CODEC 410, or both of them.

The LCD driver 408 converts the image data sent from the DSP 406 into an analog signal and sends the analog signal to the LCD 409 to be displayed. The LCD 409 functions as a finder of the camera in the embodiment. Further, the CODEC 410 encodes the image data sent from the DSP 406 and the encoded image data is recorded on the memory 411. In the embodiment, the memory 411 may be a recording device using a semiconductor, a magnetic recording medium, a magneto optical recording medium, and an optical recording medium.

Although the entire system of the digital video camera according to the embodiment is described above, the present technology is implemented for image processing in the DSP 406 in the embodiment. The image processing is described in detail hereafter.

Detail of Image Processing Section

As described above, the operation of the image processing section is implemented in the DSP 406 in the configuration of the embodiment. The operation is implemented such that a stream of an image signal is input to the DSP 406 and a calculation unit in the DSP 406 sequentially performs calculation wrote with a predetermined program code, in response to the input.

In the following description, each processing unit in the program is described as a function block and the order of performing the processes is described through a flowchart. However, the present technology may be implemented by mounting a hardware circuit that performs the same process as the function blocks described below, other than the program described in the embodiment.

Figure 20:
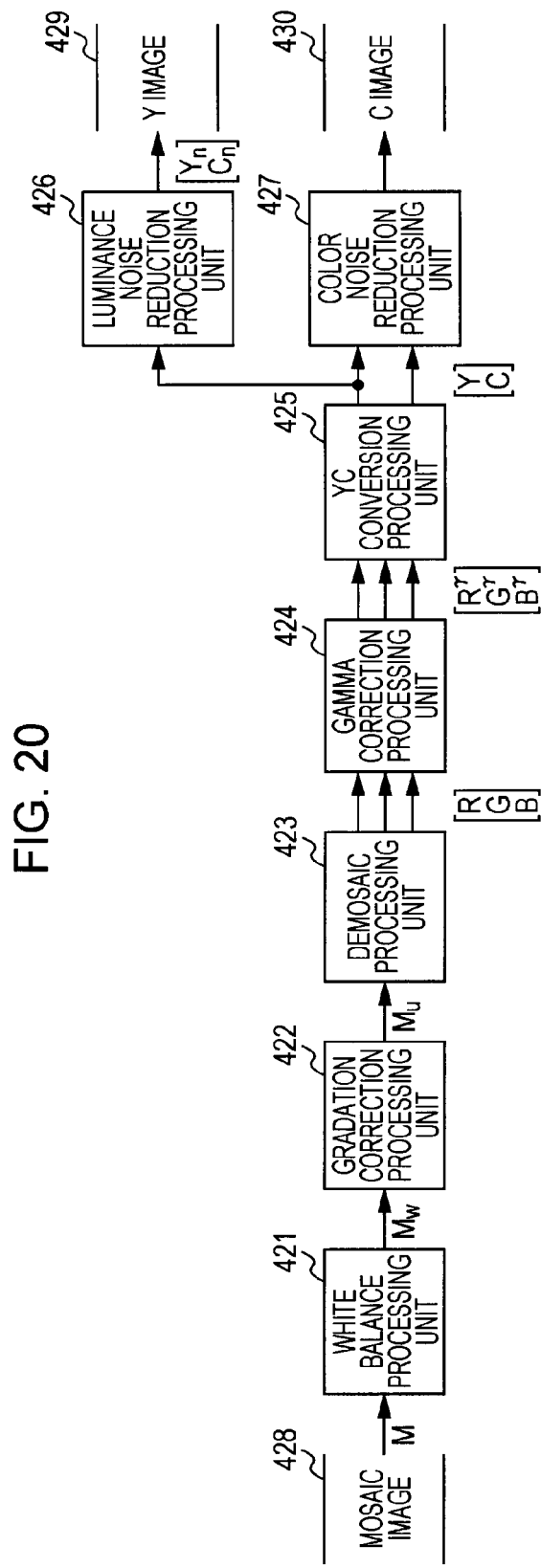
FIG. 20 is a block diagram illustrating the configuration of a signal processing unit (DSP).

FIG. 20 is a block diagram illustrating the entire configuration of the image processing section of the embodiment. In the block diagram in the specification, the figure made by two parallel lines indicates data or a memory storing data and a rectangle indicates processing.

The image processing section includes a white balance processing unit 421, a gradation correction processing unit 422, a demosaic processing unit 423, a gamma correction processing unit 424, an YC conversion processing unit 425, a luminance noise reduction processing unit 426, and a color difference noise reduction processing unit 427.

A mosaic image 428 is an input image that is input to the image processing section and this is, that is, an image signal digitized by the A/D converter 405 shown in FIG. 19 and input to the DSP 406. Thereafter, the "mosaic image" and a "RAW data" are used in the same meaning.

Figure 21:
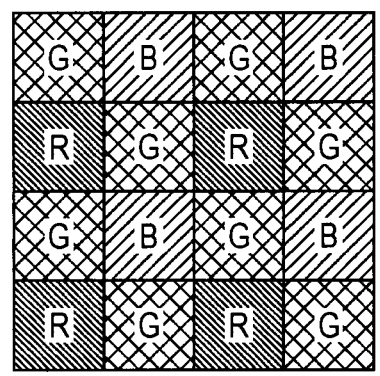
FIG. 21 is a diagram schematically showing a color arrangement (Bayer arrangement) of a mosaic image.

In general, the mosaic image 428 has an intensity signal corresponding to any color of R, G, B in each pixel and is disposed in accordance with a color arrangement called a Bayer arrangement shown in FIG. 21. A Y-image 429 and a C-image 430, which are output images from the image processing section, are YCbCr image signals output from the DSP 406 shown in FIG. 19 and input to the CODEC 410.

The operation of each unit of the image processing section is described with reference to FIG. 20.

The white balance processing unit 421 input a mosaic image (mosaic image 428) and outputs a mosaic image with an appropriate balance coefficient to each pixel such that the color balance of an achromatic object region of the mosaic image becomes achromatic.

The gradation correction processing unit 422 outputs a mosaic image, which is converted with a gradation for achieving an appropriately bright image after a gamma correction, to the demosaic processing unit 423, in response to the mosaic image with a white balance supplied from the white balance processing unit 421. The demosaic processing unit 423 outputs three images of R, G, and B, with all the intensities of R, G, and B at each pixel, in response to the mosaic image after gradation correction, which is supplied from the gradation correction processing unit 422. Further, they are generally called an RGB image hereafter.

The gamma correction processing unit 424 outputs an RGB image that has undergone gamma correction to the YC-conversion processing unit 425, in response to the RGB image supplied from the demosaic processing unit 423. The YC-conversion processing unit 425 and outputs an Y-image and a C-image by converting the image into a luminance, that is, Y-signal and a color difference, that is, C-signal, by using YC-matrix processing, in response to the RGB image, which has undergone gamma correction and supplied from the gamma correction processing unit 424.

The luminance noise reduction processing unit 426 and outputs a Y-image that has undergone a noise reduction process, in response to the Y-image from the YC-conversion processing unit 425. The color difference noise reduction processing unit 427 and outputs a C-image that has undergone a noise reduction process, in response to the Y- and C-images from the YC-conversion processing unit 425. The Y-signal and the C-signal after the noise reduction process are stored in a Y-image data store 429 and a C-image data store 430.

The present technology is used for the gradation correction processing unit 422, the luminance noise reduction processing unit 426, and the color difference noise reduction unit 427, in the operation of the image processing section described above. The detail of the operation is described below in the order of the luminance noise reduction processing unit 426, the color difference noise reduction processing unit 427, and the gradation correction processing unit 422.

Detail of Luminance Noise Reduction Processing Unit

FIG. 10 is a block diagram illustrating the internal construction of the luminance noise reduction processing unit 426. Further, the components corresponding to them of FIG. 9 are given the same reference numerals in FIG. 10. The luminance noise reduction processing unit 426 of the embodiment applies a bilateral filter process improved by the present technology to a luminance signal.

The luminance noise reduction processing unit 426 includes a peripheral pixel selection unit 101, a center pixel selection unit 102, a space distance calculation unit 103, a luminance distance calculation unit 104, a space weighting function set 131, a space weight calculation unit 105, a luminance weighting function set 132, a luminance weight calculation unit 106, a product-sum unit 107, a product-sum unit 108, a luminance integration value store 133, a weight integration value store 134, an integration value selection unit 135, and a division unit 109.

An input image 136 that is input to the luminance noise reduction processing unit 426 is a Y-(luminance) image created by the YC-conversion processing unit 425. An output image 137 of the luminance noise reduction processing unit 426 is a Y-(luminance) image with noise reduced.

The center pixel election unit 102 selects one target pixel to perform a noise reduction process, as a center pixel, in response to the input image 136, and supplies the target pixel to the space distance calculation unit 103 and a luminance distance calculation unit 104. The peripheral pixel selection unit 101 selects pixels pertaining to a predetermined range around the center pixel, in response to the input image 136, and supplies the selected pixels to the space distance calculation unit 103, the luminance distance calculation unit 104, and the product-sum unit 107.

The space distance calculation unit 103 calculates a space distance between the center pixel and each of the peripheral pixels in response to the center pixels and the peripheral pixels and supplies the distance to the space weight calculation unit 105. The luminance distance calculation unit 104 calculates a luminance distance (luminance difference) between the center pixel and each of the peripheral pixels in response to the center pixels and the peripheral pixels and supplies the distance to the luminance weight calculation unit 106.

The space weighting function set 131 is a data store retaining a plurality of normalized space weighting function data. The space weight calculation unit 105 calculates weight values on the basis of the space weighting function in response to the space distances between the peripheral pixels and the center pixel and supplies the weight values to the product-sum unit 107 and the product-sum unit 108.

The luminance weighting function set 132 is a data store retaining a plurality of normalized luminance weighting function data. The luminance weight calculation unit 106 calculates weight values on the basis of the luminance weighting function in response to the luminance distances between the peripheral pixels and the center pixel and supplies the weight values to the product-sum unit 107 and the product-sum unit 108.

The product-sum unit 107 calculates luminance integration values of the peripheral pixels which are weighted with the luminance weight values and the space weight values, in response to the peripheral pixels, the space weight values calculated by the space weight calculation unit 105, and the luminance weight values calculated by the luminance weight calculation unit 106. The product-sum unit 108 calculates a weight integration value that is the total sum of weight values obtained by multiplying the luminance weight values by the space weight values, in response to the space weight values calculated by the space weight calculation unit 105, and the luminance weight values calculated by the luminance weight calculation unit 106.

The luminance integration value store 133 is a store retaining the results of various combinations of the space weighting function and the luminance weighting function, in the luminance integration values calculated by the product-sum unit 107. The weight integration value store 134 is a store retaining the results of various combinations of the space weighting function and the luminance weighting function, in the weight integration values calculated by the product-sum unit 108.

The integration value selection unit 135 selects an optimal weight integration value on the basis of a predetermined reference (described below), in response to a plurality of weight integration values retained in the weight integration value store 134 and a plurality of luminance integration values retained in the luminance integration value store 133, selects luminance integration values, which are calculated by the same combination of the space weighting function and the luminance weighting function, and outputs the values to the division unit 109.

The division unit 109 calculates the result of dividing the selected luminance integration value by the selected space integration value in response to the selected luminance integration value and the selected space integration value, which are supplied from the integration value selection unit 135. The division result is the luminance value (output image 137) with noise reduced, in the center pixel.

Figure 22:
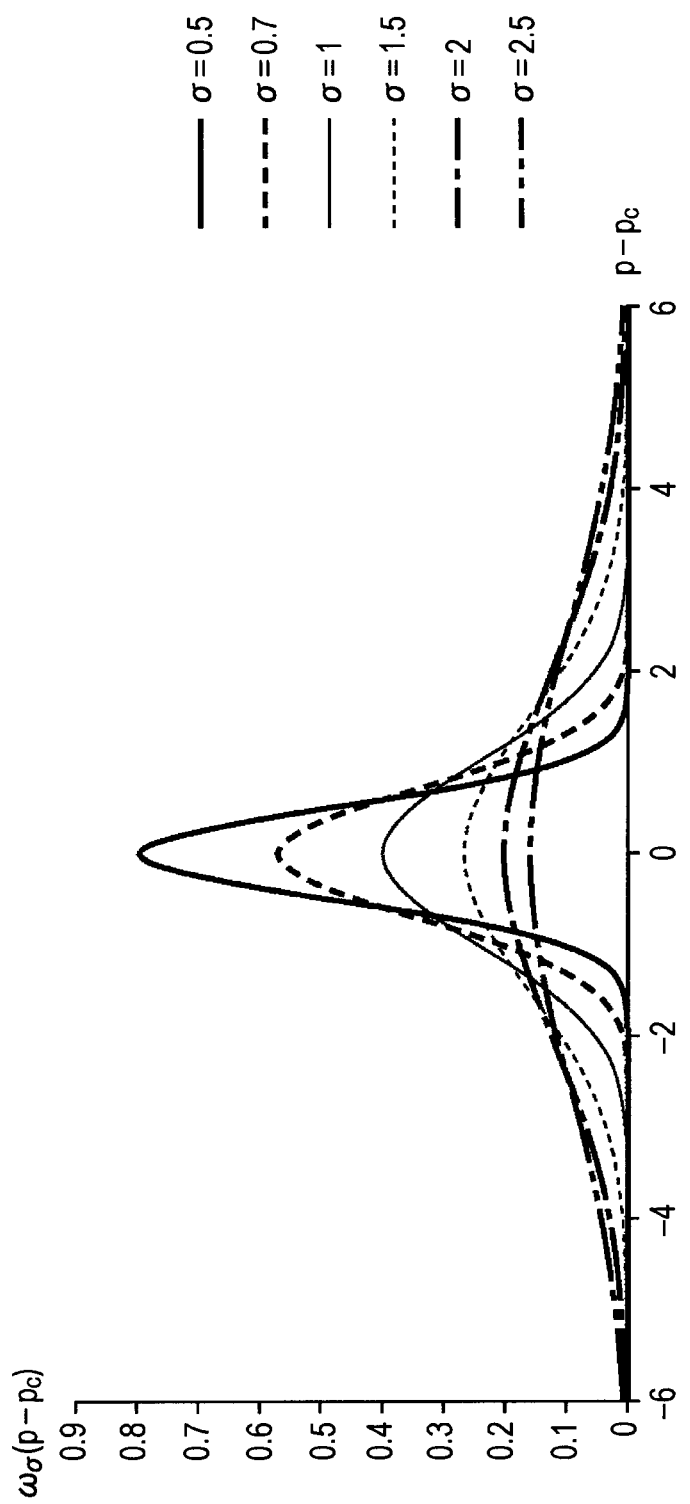
FIG. 22 is a diagram showing an example of a space weighting function.

FIG. 22 shows an example of a normalized space weighting function. The horizontal axis shows the space distance between two pixels and the vertical axis shows the weight value. A monomodal function shape having a larger weight value for a smaller space distance between two pixels is preferable as the space weighting function. A Gauss function having an expectation value of 0 may be used, as a typical example. The Gauss function can change the function width, with the integration value kept constant (=1), using standard deviation $\sigma$ as a parameter. FIG. 22 shows an example of a space weighting function by a Gauss function having different function width in accordance with six different $\sigma$.

Figure 23:
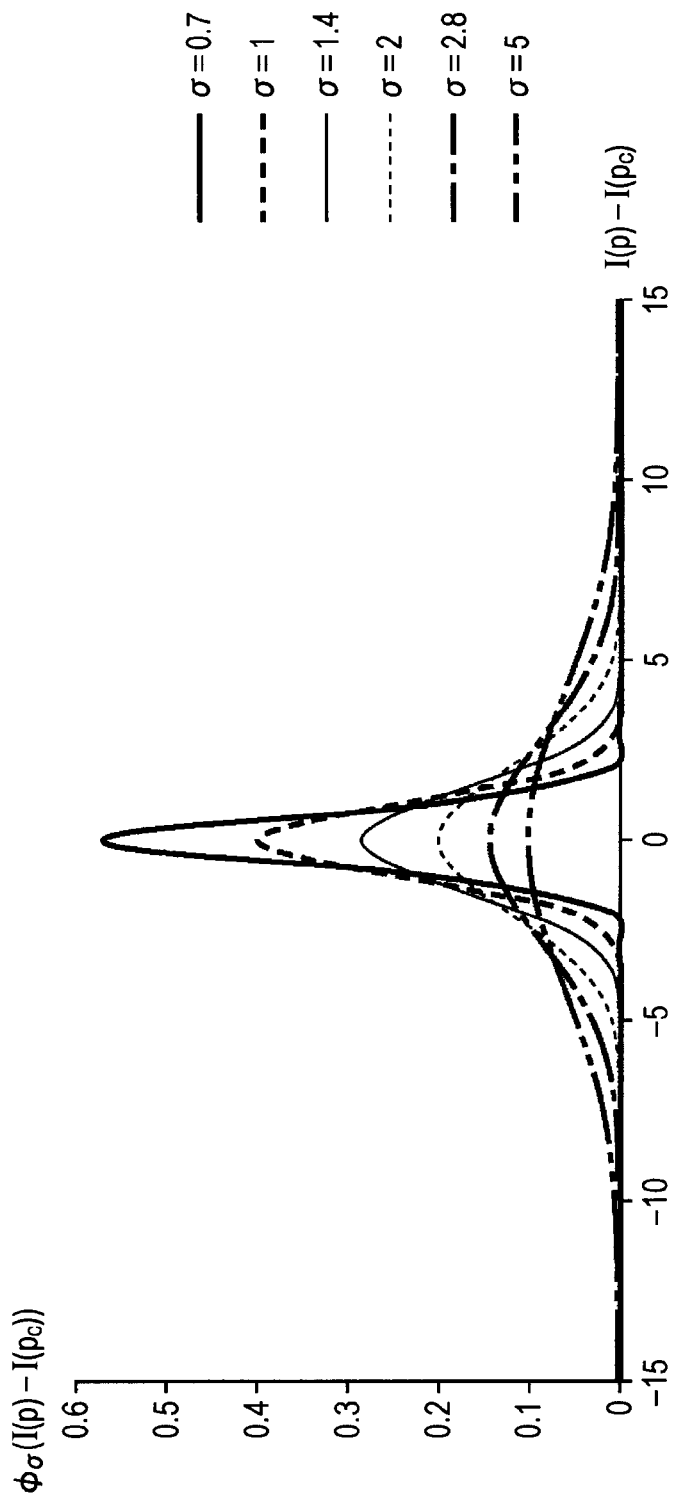
FIG. 23 is a diagram showing an example of a luminance weighting function.

FIG. 23 shows an example of a normalized luminance weighting function. The horizontal axis shows the luminance distance between two pixels and the vertical axis shows the weight value. A monomodal function shape having a larger weight value for a smaller luminance distance between two pixels is preferable as the luminance weighting function. A Gauss function having an expectation value of 0 may be used, as a typical example. The Gauss function can change the function width, with the integration value kept constant (=1), using standard deviation $\sigma$ as a parameter. FIG. 23 shows an example of a luminance weighting function by a Gauss function having different function width in accordance with six different $\sigma$.

The operations of the integration value selection unit 135 selecting the luminance integration value and the weight integration value are described hereafter.

FIG. 11 is a block diagram illustrating the internal configuration of the integration value selection unit 135.

The integration value selection unit 135 includes a maximum value selection unit 161, a selection unit 162, and a selection unit 163.

The maximum value selection unit 161 specifies combination of a space weighting function and a luminance weighting function where the weight integration value is the highest value, in response to a plurality of weight integration values retained in the weight integration value store 134. The selection unit 163 selects a weight integration value corresponding to the combination of a space weighting function and a luminance weighting function specified by the maximum value selection unit 161, in response to a plurality of weight integration values retained in the weight integration value store 134, and outputs the weight integration value to the division unit 109.

The selection unit 162 selects a luminance integration value corresponding to the combination of a space weighting function and a luminance weighting function specified by the maximum value selection unit 161, in response to a plurality of luminance integration values retained in the luminance integration value store 133, and outputs the luminance integration value to the division unit 109.

As described above, the luminance noise reduction process of the embodiment is composed of the configuration of retaining a plurality of normalized weighting functions to a common bilateral filter and the configuration of adding the configuration of selecting the optimum one from the results calculated by the plurality of weighting functions, such that it is possible to perform edge preserving smoothing on each pixel by an optimum weighting function shape by using the present technology, and accordingly, it is possible to achieve a very suitable noise reduction result in comparison to the related art.

Further, the integration value selection unit 135 of the luminance noise reduction processing unit 426 may use a configuration different from FIG. 11. The configuration of another integration value selection unit 135 is described hereafter.

FIG. 12 is a block diagram illustrating another internal configuration of the integration value selection unit 135. The integration value selection unit 135 includes a sorting unit 191, a sorted weight integration value store 192, a maximum width selection unit 193, a weighting function width information store 194, a selection unit 195, and a selection unit 196.

The sorting unit 191 extracts the values within a predetermined allowable width from the maximum value in response to a plurality of weight integration values retained in the weight integration value store 134 and retains the values in the sorted weight integration value store 192. The weighting function width information store 194 stores the function widths of all the functions in the space weighting function set and the luminance weighting function set.

The maximum width selection unit 193 specifies combination of a space weighting function and a luminance weighting function where the width of a corresponding weighting function is the maximum while referring to corresponding weight function information from the weighting function information store 194, in response to the weight integration values within a predetermined allowable width from the maximum value retained in the sorted weight integration value store 192.

The selection unit 196 selects and outputs a weight integration value corresponding to the combination of a space weighting function and a luminance weighting function specified by the maximum width selection unit 193, in response to a plurality of weight integration values retained in the weight integration value store 134.

The selection unit 195 selects and outputs a luminance integration value corresponding to the combination of a space weighting function and a luminance weighting function specified by the maximum width selection unit 193, in response to a plurality of luminance integration values retained in the luminance integration value store 133.

The information of the weighting function width means detailed parameters that can be compared in size. For example, as exemplified in FIGS. 22 and 23, for a weighting function based on a Gauss function, the σ parameter of the Gauss function may be used as the function width information. In addition, for example, for a weighting function having a triangular or a rectangular shape, the length of the base may be used as the function width information.

In the configuration of the integration value selection unit 135 of FIG. 12, a reference with as large a weighting function width as possible is used, in addition to the reference with an as large weight integration value as possible. For example, for an image with the same continuous smooth gradients, the weight integration values are substantially constant regardless of the weighting function width, such selection of a weighting function by a weight integration value does not work. However, more intense smoothing is likely to be applied to the image, such that it is possible to achieve the result of more suitable edge preserving smoothing by selecting a weighting function with an as large weighting function width as possible.

The detailed description of the luminance noise reduction processing unit 426 is as described above.

Detail of Color Difference Noise Reduction Processing Unit

FIG. 13 is a block diagram illustrating the internal construction of the color difference noise reduction processing unit 427. The color difference noise reduction process of the embodiment uses a configuration in which the edge preserving smoothing technique, which is disclosed in Japanese Unexamined Patent Application Publication No. 2009-177558 described above, is improved by using the present technology.

The color difference noise reduction processing unit 427 includes a characteristic value calculation unit 221, a histogram calculation unit 222, a block characteristic value store 223, a block histogram store 224, and a weighted expectation value calculation unit 225.

The input image 226 that is input to the color difference noise reduction processing unit 427 is an YC-(luminance-color difference) image created by the YC-conversion processing unit 425. An output image 227 of the color difference noise reduction processing unit 427 is a C-(color difference) image with noise reduced.

The histogram calculating unit 222 calculates a frequency value (block histogram) of each bin dividing the image into a plurality of luminance ranges in the luminance direction, for each block dividing the image into a plurality of region in the space direction, in response to the input image 226, and stores the block histograms to the block histogram store 224. The characteristic value calculation unit 221 calculates a color difference expectation value of pixels pertaining to the bins of the block histograms for each bin in response to the input image 226 and stores the color difference expectation values to the block characteristic value store 223, as characteristic values of the bins.

The weighted expectation value calculation unit 225 calculates a color difference weighted expectation value at each pixel position in response to the frequency value of each bin stored in the block histogram store 224 and the color difference value for each bin stored in the block characteristic value store 223, in response to the input image 226, and outputs the color difference weighted expectation values as the noise reduction result of a color difference.

The edge preserving smoothing used in the color difference noise reduction processing unit 427, according to Japanese Unexamined Patent Application Publication No. 2009-177558, is necessary to refers to all the pixels at least twice for the purpose of calculating the block histogram and the block characteristic values and for the purpose of calculating the color difference weighted expectation value at each pixel position. However, by this process, the calculation of the color difference weighted expectation values can be implemented with a less amount of calculation than a common bilateral filter, without referring to the peripheral pixels.

This is advantageous when it is necessary to refer to peripheral pixels in a wider range. It is necessary to reduce noise within a lower-frequency area than the luminance noise in the color difference noise reduction and the process of calculating the block histogram and the block characteristic values can be performed by using the information of all of frames in a system that performs signal processing of a dynamic picture image; therefore, this method is effective in the color difference noise reduction processing of the embodiment.

FIG. 15 is a block diagram illustrating the internal configuration of the weighted expectation value calculation unit 225. Further, the components corresponding to them of FIG. 14 are given the same reference numerals in FIG. 15.

The weighted expectation value calculation unit 225 includes a peripheral bin selection unit 251, a peripheral bin selection unit 252, a space distance calculation unit 253, a luminance distance calculation unit 254, a space weight calculation unit 255, a luminance weight calculation unit 256, a space weighting function store 281, a luminance weighting function store 282, a multiplication unit 257, a product-sum unit 258, a product-sum unit 259, a characteristic integration value store 283, a frequency expectation value store 284, a frequency expectation value calculation unit 285, and a division unit 260.

The peripheral bin selection unit 251 selects the bins of the block characteristic values around the pixel positions in response to the block characteristic values stored in the block characteristic value store 223 and process target (corresponding) pixel positions. The peripheral bin selection unit 252 selects the bins of the block histogram around the pixel positions in response to the block histogram stored in the block histogram store 224 and process target pixel positions.

The space distance calculation unit 253 calculates the space distances between the pixel positions and the peripheral bin positions in response to the pixel positions and the bin positions selected by the peripheral bin selection unit 252. The luminance distance calculation unit 254 calculates luminance distances (luminance differences) corresponding to the luminance values of the pixels and the peripheral bin positions, in response to the pixels and the bins selected by the peripheral bin selection unit 252.

The space weighting function store 281 is a data store retaining a plurality of normalized space weighting function data. The space weight calculation unit 255 calculates weight values on the basis of the space weighting functions, in response to the space distances between the pixel and the peripheral bins.

The luminance weighting function store 282 is a data store retaining a plurality of normalized luminance weighting function data. The luminance weight calculation unit 256 calculates weight values on the basis of the luminance weighting functions, in response to the luminance distances between the pixel and the peripheral bins. The multiplication unit 257 calculates weight values obtained by composing values obtained by multiplying the space weight value and the luminance weight value, in response to the space weight value and the luminance weight value.

The product-sum unit 259 calculates frequency expectation values weighted to the composed weight values, in response to the composed weight values and the frequency values of the peripheral bins. The frequency expectation value store 284 is a store retaining a plurality of frequency expectation values by various combinations of the space weighting function and the luminance weighting function, which are calculated by the product-sum unit 259. The product-sum unit 258 calculates the integration result of the peripheral bins of (characteristic integration values) of (composed weight value)×(frequency value)×(color difference expectation value), in response to the composed weight values, the frequency values of the peripheral bins, and the color difference expectation values of the peripheral bins. That is, the integration result of the peripheral bins of the product of the composed weight values, the frequency values, and the color difference expectation values is calculated as the characteristic integration values.

The characteristic integration value store 283 is a store retaining a plurality of characteristic integration values by various combinations of the space weighting function and the luminance weighting function, which are calculated by the product-sum unit 258. The frequency expectation value calculation unit 285 selects an optimum frequency expectation value on the basis of a predetermined reference, in response to the plurality of frequency expectation values stored in the frequency expectation value store 284 and the plurality of characteristic integration values retained in the characteristic integration value store 283, selects characteristic integration values calculated by combination of the same space weighting function and luminance weighting function, and outputs both of them.

The division unit 260 calculates the result of dividing the selected characteristic integration value by the selected frequency expectation value, in response to the selected frequency expectation value and the selected characteristic integration value. The division result is the color difference value with noise reduced in the pixel.

The reference that the frequency expectation value calculation unit 285 uses to select the frequency expectation value may be the reference of the integration value selection unit 135 of the luminance noise reduction processing unit 426. The internal configuration is the same as the configuration of the integration value selection unit 135 illustrated in FIG. 11. When the configuration is applied to the frequency expectation value calculation unit 285, the luminance integration store 133 and the weight integration value store 134, which are input in FIG. 11, are replaced by the characteristic integration value store 283 and the frequency expectation value store 284, respectively. Further, similarly, the configuration illustrated in FIG. 12 can be used.

As described above, the color difference noise reduction process of the embodiment is composed of the configuration of retaining a plurality of normalized weighting functions to edge preserving smoothing that uses the block histogram described in Japanese Unexamined Patent Application Publication No. 2009-177558 and the configuration of adding the configuration of selecting the optimum one from the results calculated by the plurality of weighting functions, such that it is possible to perform edge preserving smoothing on each pixel by an optimum weighting function shape, and accordingly, it is possible to achieve a very appropriate noise reduction result in comparison to the related art.

The detailed description of the color difference noise reduction processing unit 427 is as described above.

Detail of Gradation Correction Processing Unit

Figure 24:
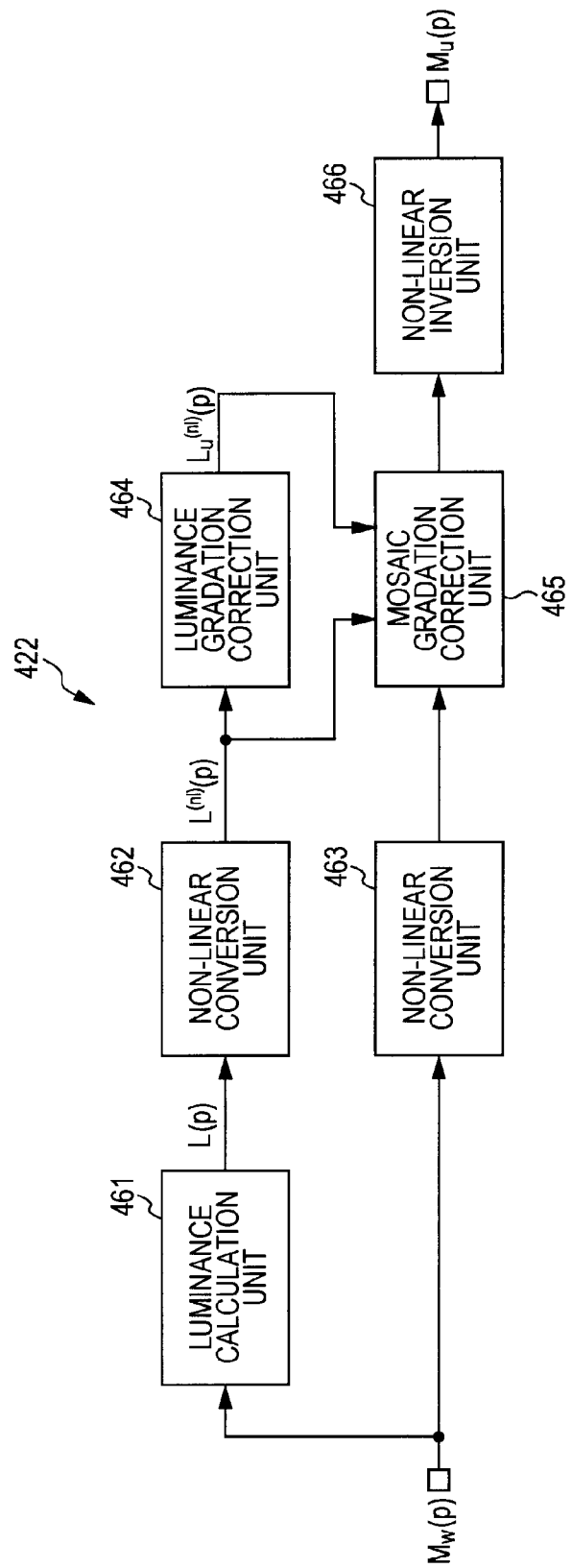
FIG. 24 is a block diagram illustrating the internal configuration of a gradation correction processing unit.

FIG. 24 is a block diagram illustrating the internal configuration of the gradation correction processing unit 422. A gradation correction process in the embodiment uses a configuration that improves the gradation correction technique disclosed in Japanese Unexamined Patent Application Publication No. 2009-177558 by using the present technology.

The gradation correction processing unit 422 includes a luminance calculation unit 461, a nonlinear conversion unit 462, a nonlinear conversion unit 463, a luminance gradation correction unit 464, a mosaic gradation correction unit 465, and a nonlinear inversion unit 466.

The luminance calculation unit 461 calculates the luminance of each pixel position in response to the mosaic image from the white balance processing unit 421. The nonlinear conversion unit 462 calculates the luminance converted into a nonlinear gradation characteristic, in response to the luminance of each pixel position. The nonlinear conversion unit 463 calculates the value obtained by converting the pixel value of each pixel position into a nonlinear gradation characteristic, in response to the mosaic image from the white balance processing unit 421.

The luminance gradation correction unit 464 calculates the luminance after gradation correction is applied, in response to the luminance after nonlinear conversion of each pixel position. The mosaic gradation correction unit 465 calculates the pixel value of the mosaic image after gradation correction, in response to the pixel value of the mosaic image after nonlinear conversion of each pixel position, the luminance after nonlinear conversion, and the luminance after gradation correction.

The nonlinear inversion unit 466 calculates the pixel value of the mosaic image of which the characteristic applied by the nonlinear conversion unit 463 is returned to the original linear characteristic, in response to the pixel value of the mosaic image after gradation correction.

As described above, the mosaic image has only one color information for each pixel. The luminance calculation unit 461 calculates the luminance value of the pixel position from the information on all of achieved colors with reference to the pixels in a predetermined range for each pixel position. For example, for the Bayer arrangement, referring to the region of 3×3 pixels, it is possible to achieve the information on all the colors R, G, and B, such that there is a method calculate linearization of the information with an appropriate coefficient.

It is preferable that the nonlinear gradation characteristic used in the nonlinear conversion unit 462 and the nonlinear conversion unit 463 have an upward convex characteristic with a smooth monotonic increase. For example, it is possible to use the gamma characteristic (power characteristic) of γ smaller than 1 or a logarithmic characteristic. The mosaic gradation correction unit 465 performs calculation by reflecting a change in luminance value before and after gradation correction while maintaining the color balance of the mosaic image, which is an input.

For example, when the nonlinear characteristic is the γ characteristic described above, calculation of multiplying the pixel value of the mosaic image with the ration of the luminance values before and after gradation correction is performed. Further, when the nonlinear characteristic is the logarithmic characteristic, calculation of adding the difference in the luminance values before and after gradation correction to the pixel value of the mosaic image.

The detail of the luminance gradation correction unit 464 that is a portion improved by the present technology is described hereafter.

Figure 25:
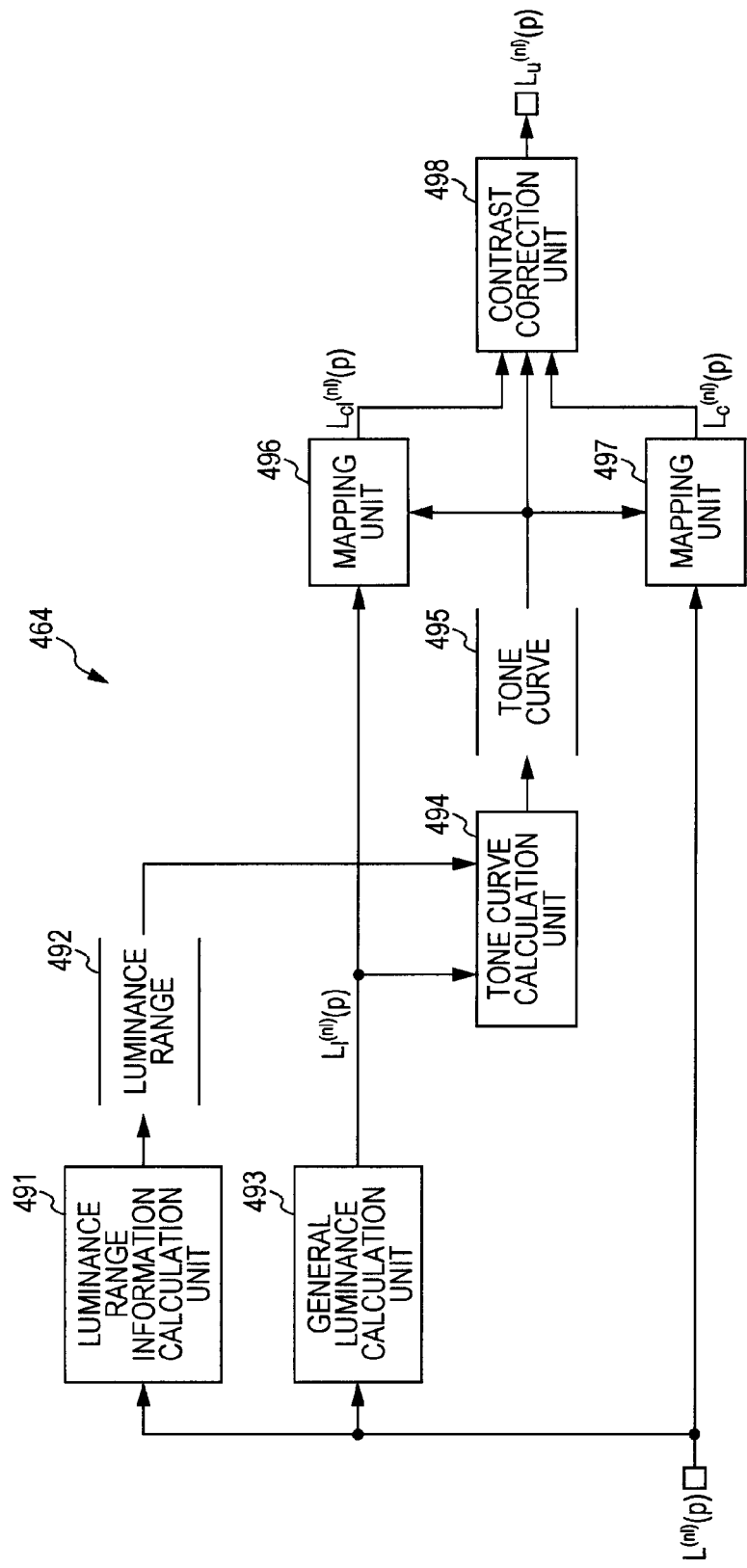
FIG. 25 is a block diagram illustrating the internal configuration of a luminance gradation correction unit.

FIG. 25 is a block diagram illustrating the internal configuration of luminance gradation correction unit 464.

The luminance gradation correction unit 464 includes a luminance range information calculation unit 491, a luminance range information store 492, a general luminance calculation unit 493, a tone curve calculation unit 494, a tone curve store 495, a mapping unit 496, a mapping unit 497, and a contrast correction unit 498.

The luminance range information calculation unit 491 calculates the luminance range information of an input image, in response to the luminance value of each pixel after nonlinear conversion which is an input from the nonlinear conversion unit 462 to the luminance gradation correction unit 464 (hereafter, when the input to the luminance gradation correction unit 464 is after nonlinear conversion is omitted, if not interfering with the description).

The luminance range information store 492 is a data store that stores luminance range information calculated by the luminance range information calculation unit 491. The general luminance calculation unit 493 calculates the generation luminance value of each pixel position in response to the luminance of each pixel. The tone curve calculation unit 494 calculates the tone curve shape of each pixel position in response to the luminance range information stored in the luminance range information store 492 and the generation luminance value of the pixel positions.

The tone curve store 495 is a data store retaining the tone curve shape of the pixel position calculated by the tone curve calculation unit 494. The mapping unit 496 calculates the general luminance value of the pixel position where the tone curve is applied, in response to the tone curve retained in the tone curve store 495 and the generation luminance value of the pixel.

The mapping unit 497 calculates the luminance value of the pixel position where the tone curve is applied, in response to the tone curve retained in the tone curve store 495 and the luminance value of the pixel. The contrast correction unit 498 calculates the luminance value of the pixel position that has undergone contrast correction, in response to the general luminance value of the pixel position after tone curve is applied, the luminance value of the pixel position after the tone curve is applied, and the tone curve, and outputs the gradation correction result of the luminance to the mosaic gradation correction unit 465.

In the embodiment, the luminance range information is the information in the luminance range that the input image has, in detail, the information composed of two luminance levels corresponding to the peripheries of the dark side and the bright side of the luminance histogram of the input image. A detailed method of calculating the information for each frame from an input image is disclosed in Japanese Unexamined Patent Application Publication No. 2009-177558.

In the embodiment, the general luminance is the information showing a general luminance distribution. A detailed method of calculating a general luminance by using edge preserving smoothing is disclosed in Japanese Unexamined Patent Application Publication No. 2009-177558. The general luminance calculation unit 493 of the embodiment has a configuration that calculates a general luminance in accordance with a method that improves the edge preserving smoothing disclosed in Japanese Unexamined Patent Application Publication No. 2009-177558 by using the present technology. The detail is described blow.

In the embodiment, the tone curve shows a smooth monotone-increasing gradation characteristic that is variable in accordance with an image and applied to reproduce the luminance range of the image with appropriate brightness. A detailed method of calculating a tone curve that changes for each pixel position, on the basis of luminance range information calculated for each frame and a general luminance value calculated for each pixel is disclosed in Japanese Unexamined Patent Application Publication No. 2009-177558.

The mapping unit 496 and the mapping unit 497 perform calculation that is simple such that the tone curve can be applied to each input value.

The contrast correction unit 498 performs calculation of correcting the contrast component of the input image, which is weakened by applying the tone curve, to return to the original. In detail, the correction is performed by extracting the difference between the luminance value after applying the tone curve and the general luminance value after applying the tone curve as a contrast component, applying an appropriate gain to the difference to emphasize, and then adding it to the luminance value after applying the tone curve to return. The gain for emphasizing the contrast component can be determined on the basis of the luminance value after the tone curve is applied and the tone curve shape. A detailed method of calculating contrast correction and determining a gain is disclosed in Japanese Unexamined Patent Application Publication No. 2009-177558.

FIG. 16 is a block diagram illustrating the internal configuration of the general luminance calculation unit 493. A general luminance calculation in the embodiment uses a configuration that improves the edge preserving smoothing technique disclosed in Japanese Unexamined Patent Application Publication No. 2009-177558 by using the present technology.

The general luminance calculating unit 493 includes a characteristic value calculation unit 311, a histogram calculation unit 312, a block characteristic value store 313, a block histogram store 314, a convolution unit 315, a smoothing block characteristic value store 316, a smoothing block histogram store 317, a correction unit 318, an interpolation unit 319, and a division unit 320.

An input image 321 from the nonlinear conversion unit 462 to the general luminance calculation unit 493 has luminance after nonlinear conversion (hereafter, when the input to the luminance gradation correction unit is after nonlinear conversion is omitted, if not interfering with the description). An output image 322 of the general luminance calculation unit 493 has general luminance.

The histogram calculating unit 312 calculates a frequency value (block histogram) of each bin dividing the image into a plurality of luminance ranges in the luminance direction, for each block dividing the image into a plurality of region in the space direction, in response to the input image 321, and stores the block histograms to the block histogram store 314. The characteristic value calculation unit 311 calculates a luminance expectation value of pixels pertaining to the bins of the block histograms for each bin in response to the input image 321 and stores the color difference expectation values to the block characteristic value store 313, as characteristic values of the bins.

The convolution unit 315 calculates a plurality of convolutions of a space weighting function and a luminance weighting function, which are provided in advance, in response to the frequency value of each bin stored in the block histogram store 314 and the luminance expectation value of each bin stored in the block characteristic value store 313, calculates the smoothing result of the frequency value and the smoothing result of the luminance integration value for each bin, and stores the results to the smoothing block histogram store 317 and the smoothing block characteristic value store 316, respectively.

The interpolation unit 319 calculates an interpolation value to each pixel position of the smoothed frequency value, in response to the input image 321 and the smoothed frequency values stored in the smoothing histogram store 317. The interpolation unit 318 calculates an interpolation value to each pixel position of the smoothed luminance value, in response to the input image 321 and the smoothed luminance values stored in the smoothing block characteristic value store 316.

The division unit 320 calculates the result of dividing the smoothed luminance integration value by the smoothed frequency value, in response to the smoothed luminance integration value and the smoothed frequency value, and outputs the result to the output image 322 as a general luminance value.

The edge preserving smoothing used in the general luminance calculation unit 493, according to Japanese Unexamined Patent Application Publication No. 2009-177558, similar to the edge preserving smoothing used in the color difference noise reduction processing unit 427 described above, can reduce the amount of calculation for each pixel by calculating the block histogram and the block characteristic value before the calculation for each pixel.

Further, the convolution calculation of the space weighting function and the luminance weighting function can also further reduce the amount of calculation for each pixel by performing the calculation in advance for each bin of the block histogram. Therefore, this is a method suitable for an edge preserving smoothing process that is necessary to refer to the pixels in a wider range, as in general luminance calculation.

FIG. 18 is a block diagram illustrating the internal configuration of the convolution unit 315. Further, the components corresponding to them of FIG. 17 are given the same reference numerals in FIG. 18.

The convolution unit 315 includes a center bin selection unit 353, a peripheral bin selection unit 351, a peripheral bin selection unit 352, a space distance calculation unit 354, a luminance distance calculation unit 355, a space weight calculation unit 356, a luminance weight calculation unit 357, a space weighting function store 381, a luminance weighting function store 382, a multiplication unit 358, a product-sum unit 359, a product-sum unit 360, a characteristic integration value store 383, a frequency expectation value store 384, and a frequency expectation value calculation unit 385.

The center bin selection unit 353 selects the bin of a block histogram, which is a process target, as a center bin, in response to a block histogram stored in the block histogram store 314. The peripheral bin selection unit 351 selects the bins of the block characteristic values around the bin that is the process target, in response to the block characteristic values stored in the block characteristic value store 313.

The peripheral bin selection unit 352 selects the bins of the block histogram around the bin that is the process target, in response to the block histogram stored in the block histogram store 314. The space distance calculation unit 354 calculates space distances between the center bin position and the peripheral bin positions in response to the bins selected by the center bin selection unit 353 and the peripheral bin selection unit 352.

The luminance distance calculation unit 355 calculates luminance distances (luminance differences) between the luminance value corresponding to the center bin and the luminance values corresponding to the peripheral bin positions, in response to the bins selected by the center bin selection unit 353 and the peripheral bin selection unit 352.

The space weighting function store 381 is a data store retaining a plurality of normalized space weighting function data. The space weight calculation unit 356 calculates weight values on the basis of the space weighting functions, in response to the space distances between the center bin and the peripheral bins. The luminance weighting function store 382 is a data store retaining a plurality of normalized luminance weighting function data.

The luminance weight calculation unit 357 calculates weight values on the basis of the luminance weighting functions, in response to the luminance distances between the center bin and the peripheral bins. The multiplication unit 358 calculates weight values obtained by composing values obtained by multiplying the space weight value and the luminance weight value, in response to the space weight value and the luminance weight value. The product-sum unit 360 calculates frequency expectation values weighted to the composed weight values, in response to the composed weight values and the frequency values of the peripheral bins.

The frequency expectation value store 284 is a store retaining a plurality of frequency expectation values by various combinations of the space weighting function and the luminance weighting function, which are calculated by the product-sum unit 360. The product-sum unit 359 calculates the product-sum result of the peripheral bins of (characteristic integration values) of (composed weight value)×(frequency value)×(luminance expectation value), in response to the composed weight values, the frequency values of the peripheral bins, and the luminance expectation values of the peripheral bins.

The characteristic integration value store 383 is a store retaining a plurality of characteristic integration values by various combinations of the space weighting function and the luminance weighting function, which are calculated by the product-sum unit 359. The frequency expectation value calculation unit 385 selects an optimum frequency expectation value on the basis of a predetermined reference, in response to the plurality of frequency expectation values stored in the frequency expectation value store 384 and the plurality of characteristic integration values retained in the characteristic integration value store 383, selects characteristic integration values calculated by combination of the same space weighting function and luminance weighting function, and outputs both of them to the center bin positions of the smoothing block histogram store 317 and the smoothing block characteristic value store 316, respectively.

The reference that the frequency expectation value selection unit 385 uses to select the frequency expectation value may be the reference of the integration value selection unit 135 of the luminance noise reduction processing unit 426. The internal configuration is the same as the configuration of the integration value selection unit 135 illustrated in FIG. 11.

When the configuration is applied to the frequency expectation value selection unit 385, the luminance integration store 133 and the weight integration value store 134, which are input in FIG. 11, are replaced by the characteristic integration value store 383 and the frequency expectation value store 384, respectively. Further, similarly, the configuration illustrated in FIG. 12 can be used.

As described above, the gradation correction process of the embodiment is composed of the configuration of retaining a plurality of normalized weighting functions to edge preserving smoothing that uses the block histogram described in Japanese Unexamined Patent Application Publication No. 2009-177558 described above and the configuration of adding the configuration of selecting the optimum one from the results calculated by the plurality of weighting functions, such that it is possible to perform edge preserving smoothing, that is, general luminance calculation on each pixel by an optimum weighting function shape, and accordingly, it is possible to achieve a very appropriate gradation correction result in comparison to the related art.

The detailed description of the gradation correction processing unit 422 is as described above.

Description of Processing Order

The processing order of the embodiment is described hereafter.

Figure 26:
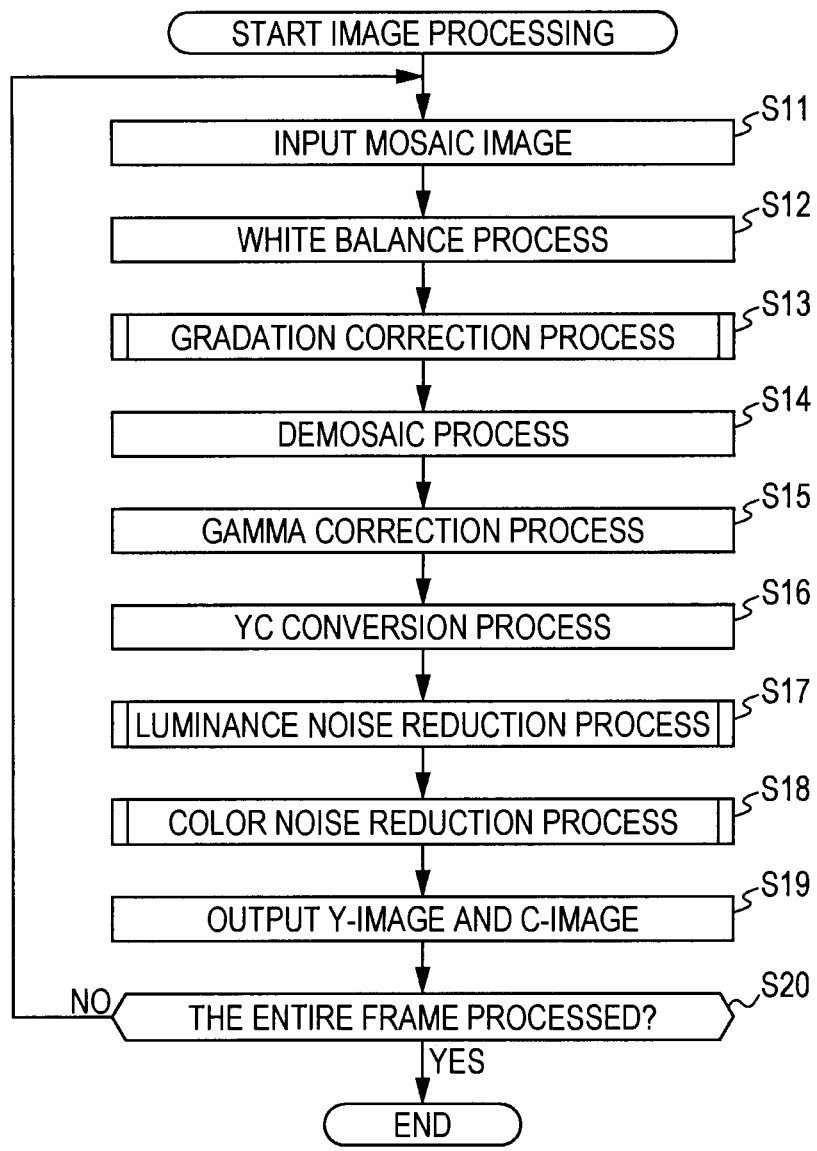
FIG. 26 is a flowchart illustrating image processing.

FIG. 26 is a flowchart illustrating the operation order of the entire image processing section (corresponding to FIG. 20).

In the image processing, continuous frame data imaged by the image sensor is processed sequentially by one frame until there is no next frame.

In step S11, the mosaic image of the next frame stored in the memory in the DSP 406 is read out.

In step S12, the white balance processing unit 421 applies a white balance coefficient to the mosaic image.

In step S13, the gradation correction processing unit 422 creates a mosaic image that has undergone gradation correction.

In step S14, the demosaic processing unit 423 creates an RGB image from the mosaic image.

In step S15, the gamma correction processing unit 424 creates an RGB image that has undergone gamma correction.

In step S16, the YC-conversion processing unit 425 creates a Y-image and a C-image.

In step S17, the luminance noise reduction processing unit 426 outputs a Y-image where the noise reduction process is applied.

In step S18, the color difference noise reduction processing unit 427 outputs a C-image where the noise reduction process is applied.

In step S19, the Y-image and the C-image are output to be displayed on the LCD 409 or preserved on a recording medium. As described above, the operation for one frame of the image processing section is finished.

In step S20, it is determined whether all the frames are processed. For example, when there is on next input frame, it is determined that all the frames have been processed.

When it is determined that all the frames have been processed in step S20, the process returns to step S11 and the processes described above are repeated. Meanwhile, in step S20, when it is determined that all the frames have been processed, the image processing is finished.

As described above, the operation of the image processing section is finished.

Figure 27:
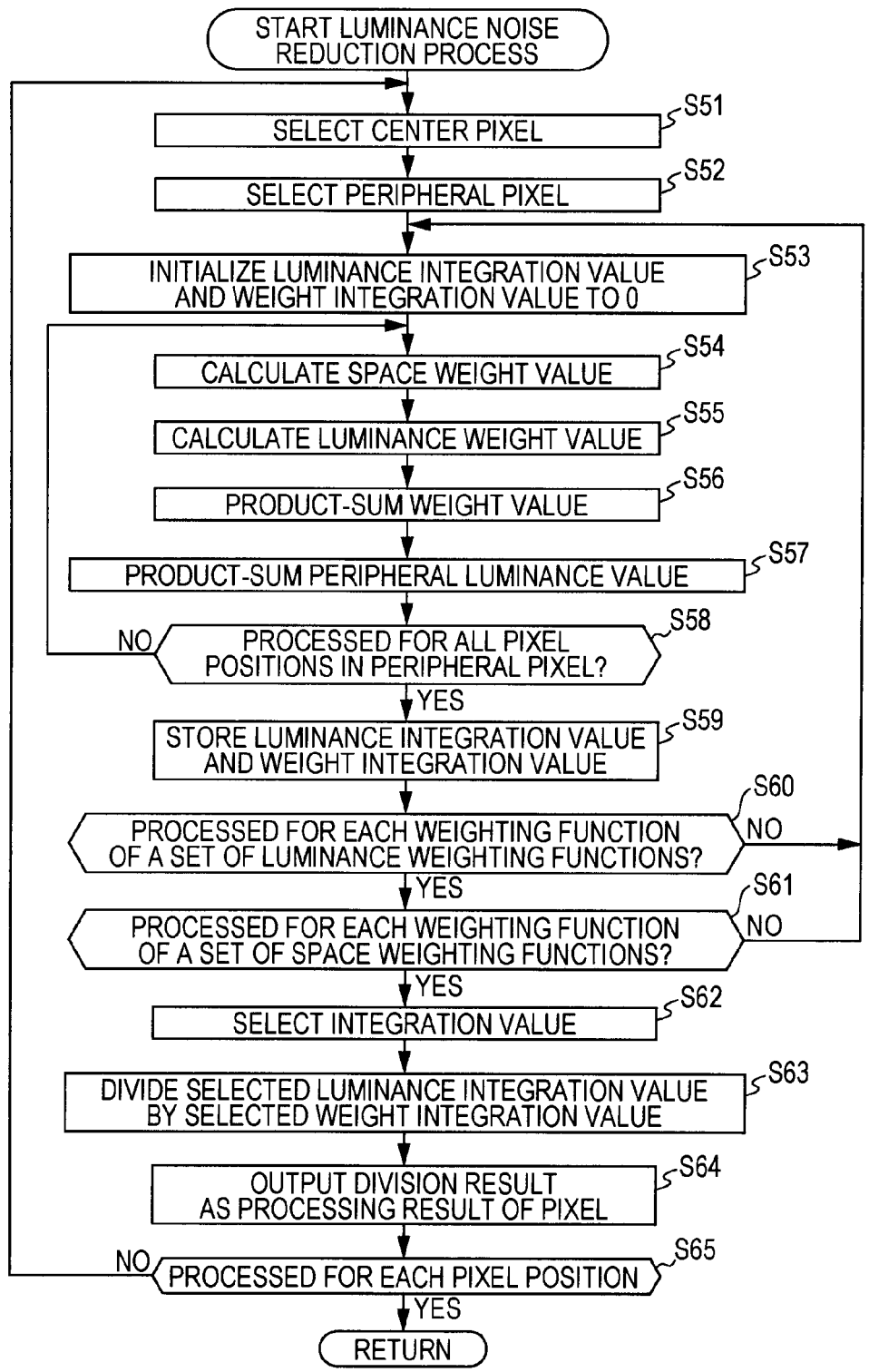
FIG. 27 is a flowchart illustrating a luminance noise reduction process.

FIG. 27 is a flowchart illustrating the operation order of the luminance noise reduction processing unit 426. That is, FIG. 27 is a flowchart illustrating a luminance noise reduction process corresponding to the process in step S17 of FIG. 26.

In step S51, the center pixel selection unit 102 selects the pixel position of the Y-image input to the luminance noise reduction processing unit 426 as a center pixel.

In step S52, the peripheral pixel selection unit 101 selects the pixels in a predetermined range around the center pixel.

In step S53, the luminance integration values and the weight integration values that correspond to combination of the space weighting functions of the space weighting function sets 131 and the luminance weighting functions of the luminance weighting function set 132 are initialized to 0.

In step S54, at the pixel positions pertaining to the peripheral pixels, space weight values at the peripheral pixel positions are calculated by the space distance calculation unit 103 and the space weight calculation unit 105 on the basis of the center pixel, the peripheral pixels, and the space weighting functions.

In step S55, the peripheral pixel positions and the luminance weight values are calculated by the luminance distance calculation unit 104 and the luminance weight calculation unit 106 on the bin of the center pixel, the peripheral pixels, and the luminance weight functions.

In step S56, values obtained by multiplying the space weight values by the luminance weight values at the peripheral pixel positions are added to the weight integration value by the product-sum unit 108.

In step S57, values obtained by multiplying the space weight values and the luminance weight values at the peripheral pixel positions by the luminance values of the peripheral pixels are added to the luminance integration value by the product-sum unit 107.

In step S58, it is determined whether the process has been performed on all the pixel positions pertaining to the peripheral pixels. When it is determined that the process has not been performed on all the pixel positions in step S58, the process returns to step S54 and the processes described above are repeated.

On the other hand, when it is determined that the process has been performed on all the pixel positions in step S58, in step S59, the results of luminance integration values and weight integration values corresponding to combination of the space weighting function and the luminance weighting function, which integrate the peripheral pixels, are retained in the luminance integration value store 133 and the weight integration value store 134.

In step S60, it is determined whether the process has been performed on all the weighting functions of the luminance weighting function set 132. When it is determined that the process has not been performed on all the weighting functions in step S60, the process returns to step S53 and the processes described above are repeated.

Further, when it is determined that the process has been performed on all the weighting functions in step S60, in step S61, it is determined whether the process has been performed on all the weighting functions of the space weighting function set 131.

When it is determined that the process has not been performed on all the weighting functions in step S61, the process returns to step S53 and the processes described above are repeated.

Meanwhile, when it is determined that the process has been performed on all the weighting functions in steps S61, the process proceeds to step S62. That is, when the processes from step S53 to S59 are performed on the combination of all the space weighting functions and luminance weighting functions, the process proceeds to step S62.

In step S62, the integration value selection unit 135 selects a set of a luminance integration value and a weight integration value.

In step S63, the division unit 109 calculates the result of dividing the selected luminance integration value by the selected weight integration value.

In step S64, the division result is output as luminance with noise reduced at the center pixel position.

In step S65, it is determined whether the processes from step S51 to step S64 have been performed at all the pixel positions. When it is determined that the process has not been performed on all the pixel positions in step S65, the process returns to step S51 and the processes described above are repeated.

On the other hand, when it is determined that the process has been performed on all the pixel positions in step S65, the luminance noise reduction process is finished and then the process proceeds to step S18 of FIG. 26.

As described above, the operation of the luminance noise reduction processing unit 426 is finished.

Figure 28:
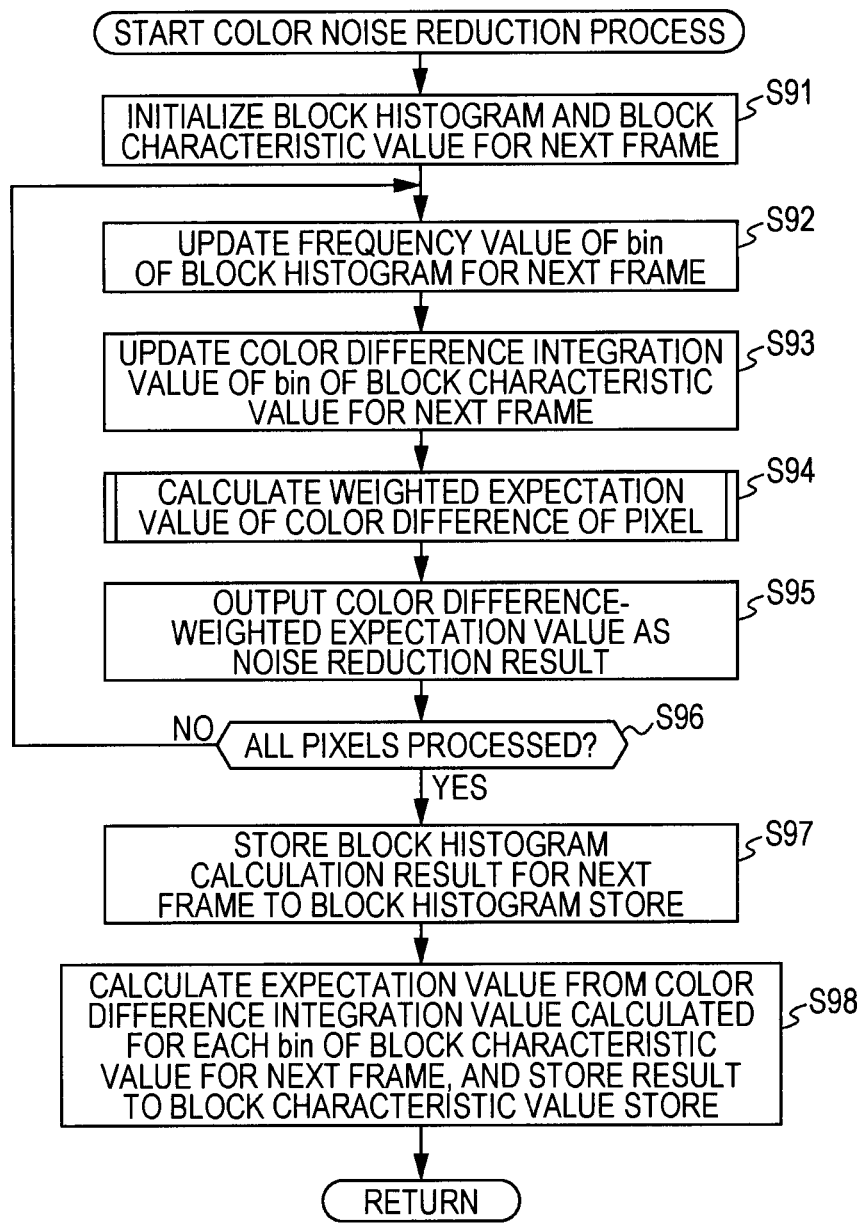
FIG. 28 is a flowchart illustrating a color difference noise reduction process.

FIG. 28 is a flowchart illustrating the operation order of the color difference noise reduction processing unit 427. That is, FIG. 28 is a flowchart illustrating a color noise reduction process corresponding to the process in step S18 of FIG. 26.

In step S91, a data region for calculating a block histogram and a block characteristic value that are used in the next frame are ensured and initialized to 0.

In step S92, the histogram calculation unit 222 estimate the luminance of the pixel and determines a corresponding bin, at the pixel position of the YC-image input to the color noise reduction processing unit 427 and updates the frequency value of the bin of the block histogram for the next frame to +1.

In step S93, the characteristic value calculation unit 221 estimates the luminance of the pixel and determines a corresponding bin and adds the color difference value of the pixel to the color difference integration value corresponding to the bin of the block characteristic value for the next frame.

In step S94, the weighted expectation value calculation unit 225 calculates the weighted expectation value of the color at the pixel position by using the block characteristic value of the present frame stored in the block characteristic value store 223 and the block histogram for the present frame stored in the block histogram store 224.

In step S95, the weighted expectation value of the color difference at the pixel position is output as the color noise reduction result at the pixel position.

In step S96, it is determined whether the processes from step S92 to step S95 have been performed at all the pixel positions. That is, it is determined whether the process has been performed on each pixel position of the YC-image input to the color difference noise reduction process 427.

When it is determined that the process has not been performed on all the pixel positions in step S96, the process returns to step S92 and the processes described above are repeated.

On the other hand, when it is determined that the process has been performed on all the pixel positions in step S96, in step S97, the histogram calculation unit 222 stores the calculation result of the block histogram for the next frame to the block histogram store 224.

In step S98, the characteristic value calculation unit 221 calculates the color difference expectation value of each bin from the calculation result of the color difference integration value of each bin of the block characteristic value for the next frame, stores the calculation value to the block characteristic value store 223, and the color difference noise reduction process is finished. Thereafter, the process proceeds to step S19 of FIG. 26.

As described above, the operation of the color difference noise reduction processing unit 427 is finished.

Figure 29:
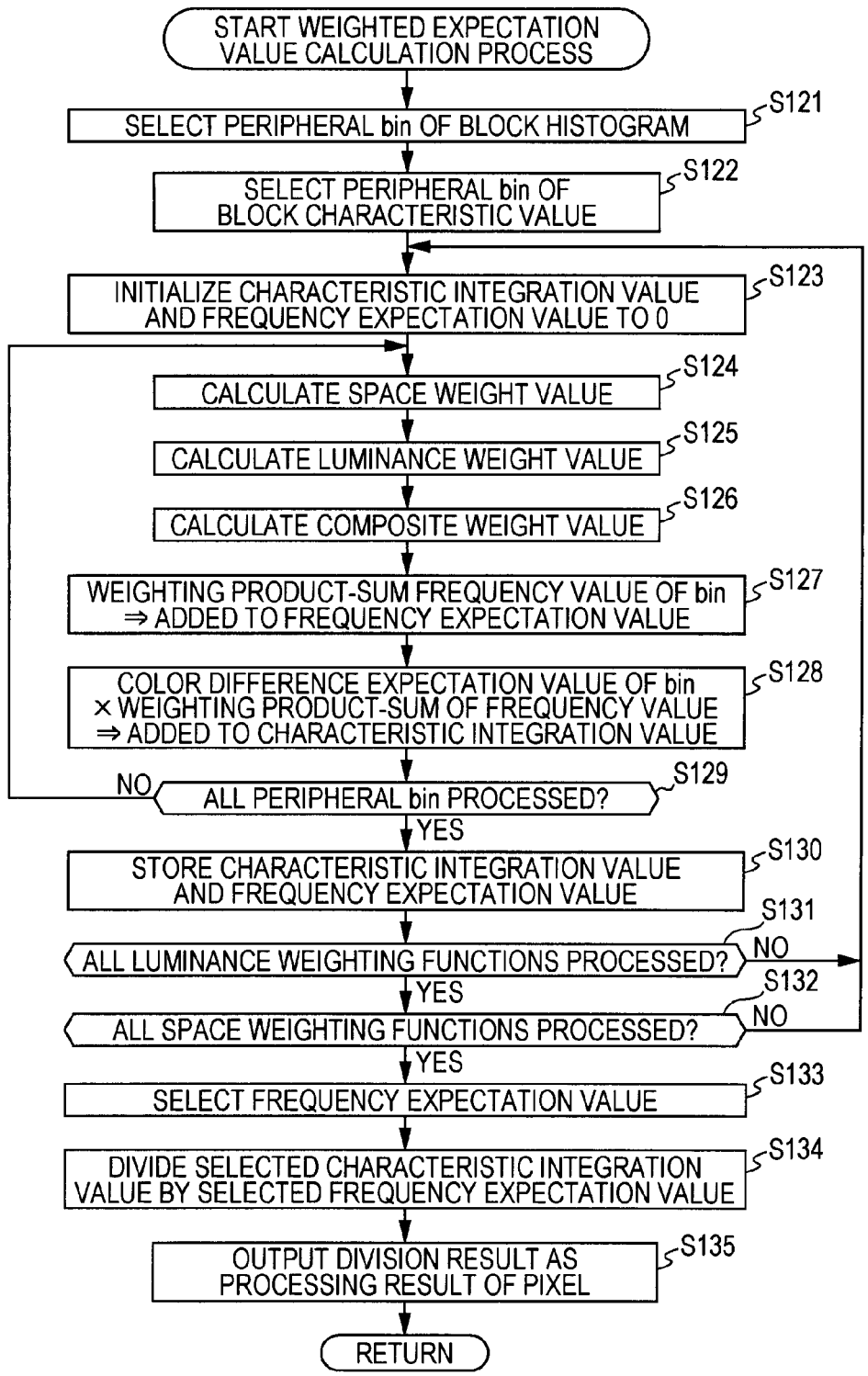
FIG. 29 is a flowchart illustrating a weighted expectation value calculation process.

FIG. 29 is a flowchart illustrating the operation order of the weighted expectation value calculation process corresponding to step S94 of the color difference noise reduction process of FIG. 28. As the process configuration, the operation at the pixel position with the weighted expectation value calculation unit 225 (hereafter, center pixel position), corresponding to the internal process of the weighted expectation value calculation unit 225 of FIG. 13 is described.

In step S121, the peripheral bin selection unit 252 selects peripheral bins of the block histogram positioned around the center pixel position.

In step S122, the peripheral bin selection unit 251 selects peripheral bins of the block characteristic value positioned around the center pixel position.

In step S123, the characteristic integration values and the frequency expectation values that correspond to combination of the space weighting functions of the space weighting function sets 281 and the luminance weighting functions of the luminance weighting function set 282 are initialized to 0.

In step S124, the space distance calculation unit 253 and the space weight calculation unit 255 calculate space weight values based on the center pixel, the peripheral bins, and the space weighting function, for each of the selected peripheral bins.

In step S125, the luminance distance calculation unit 254 and the luminance weight calculation unit 256 calculates luminance weight values based on the center pixel, the peripheral bins, and the luminance weighting function.

In step S126, the multiplication unit 257 calculates a composite weight value obtained by multiplying the space weight value by the luminance weight value.

In step S127, the product-sum unit 259 calculates values obtained by multiplying the composite weight value by the luminance values of the peripheral bins and adds the values to the calculation result of the frequency expectation value until now.

In step S128, the product-sum unit 258 calculates values obtained by multiplying the composite weight value, the frequency values of the peripheral bins, and the color difference expectation values of the peripheral bins, and adds the values to the calculation result of the characteristic expectation value until now.

In step S129, it is determined whether the processes from step S124 to step S128 have been performed at all the peripheral bins. When it is determined that the process has not been performed on all the peripheral bins in step S129, the process returns to step S124 and the processes described above are repeated.

On the other hand, when it is determined that the process has been performed on all the peripheral bins in step S129, in step S130, the result of the frequency expectation values and the characteristic integration values corresponding to the combination of the space weighting function and the luminance weighting function are retained in the characteristic integration value store 283 and the frequency expectation value store 284, respectively.

In step 131, it is determined whether the processes from step S123 to step 130 have been performed on all the weighting functions of the luminance weighting function set 282.

When it is determined that the process has not been performed on all the weighting functions in step S131, the process returns to step S123 and the processes described above are repeated.

On the other hand, when it is determined that the process has been performed on all the weighting functions in step S131, in step S132, it is determined whether the processes from step S123 to step S131 have been performed on all the weighting functions of the space weighting function set 281.

When it is determined that the process has not been performed on all the weighting functions in step S132, the process returns to step S123 and the processes described above are repeated.

Meanwhile, when it is determined that the process has been performed on all the weighting functions in step S132, the process proceeds to step S133. That is, when the combination of all of the space weighting functions and the luminance weighting functions is processed, the process proceeds to step S133.

In step S133, the frequency expectation value selection unit 285 selects a set of a characteristic integration value and a frequency expectation integration value.

In step S134, the division unit 260 calculates the result of dividing the selected characteristic integration value by the selected frequency expectation value.

In step S135, the division result is output as a color difference value with noise reduced at the center pixel position and the weighted expectation value calculation process is finished. Thereafter, the process proceeds to step S95 of FIG. 28.

The operation of the weighted expectation value calculation unit 225 is finished as described above.

Figure 30:
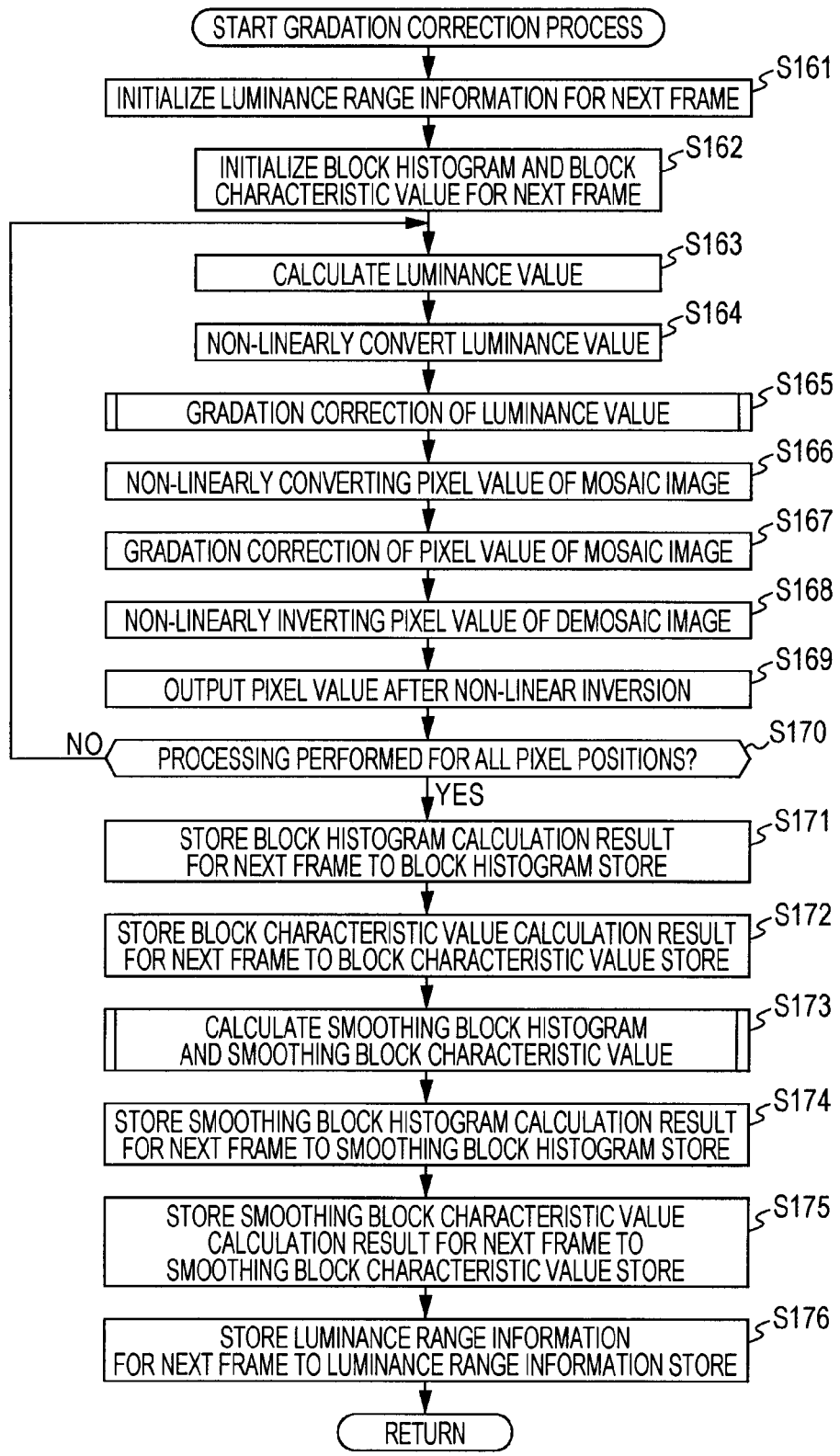
FIG. 30 is a flowchart illustrating a gradation correction process.

FIG. 30 is a flowchart illustrating the operation order of the gradation correction processing unit 422. That is, FIG. 30 is a flowchart illustrating a gradation correction process corresponding to the process in step S13 of FIG. 26.

In step S161, a data region for calculating luminance range information that is used in the next frame is ensured and initialized to 0.

In step S162, a data region for calculating a block histogram and a block characteristic value that are used in the next frame are ensured and initialized to 0.

In step S163, the luminance calculation unit 461 calculates the luminance value of the pixel position at the pixel position of the input mosaic image.

In step S164, the nonlinear conversion unit 462 nonlinearly converts the luminance value of the pixel position.

In step S165, the luminance gradation correction unit 464 applies a gradation correction process to the luminance value of the pixel position after the nonlinear conversion.

In step S166, the nonlinear conversion unit 463 nonlinearly converts the pixel value of the pixel position of the input mosaic image.

In step S167, the mosaic gradation correction unit 465 reflects the gradation correction result of the luminance value of the pixel position to the pixel value of the mosaic image of the pixel position after the nonlinear conversion.

In step S168, the nonlinear inversion unit 466 inverts and returns the nonlinear characteristic of the pixel value of the mosaic image of the pixel position after the gradation correction to the original.

In step S169, the pixel value after the nonlinear inversion is output as the gradation correction result at the pixel position.

In step S170, it is determined whether the process has been performed on all the pixel positions of the input mosaic image. When it is determined that the process has not been performed on all the pixel positions in step S170, the process returns to step S163 and the processes described above are repeated.

On the other hand, when it is determined that the process has been performed on all the pixel positions in step S170, in step S171, the calculation result of the block histogram that is used in the next frame is stored in the block histogram 314.

In step S172, the calculation result of the block characteristic value that is used in the next frame is stored in the block characteristic value store 313.

In step S173, the convolution unit 315 calculates a smoothed block histogram and a smoothed block characteristic value.

In step S174, the calculation result of the smoothed block histogram that is used in the next frame is stored in the smoothing block histogram store 317.

In step S175, the calculation result of the smoothed block characteristic value histogram that is used in the next frame is stored in the smoothing block characteristic value store 316.

In step S176, the calculation result of the luminance range information that is used in the next frame is stored in the luminance range information store 492, thereby finishing the gradation correction process. Thereafter, the process proceeds to step S14 of FIG. 26.

The operation of the gradation correction processing unit 422 is finished as described above.

Figure 31:
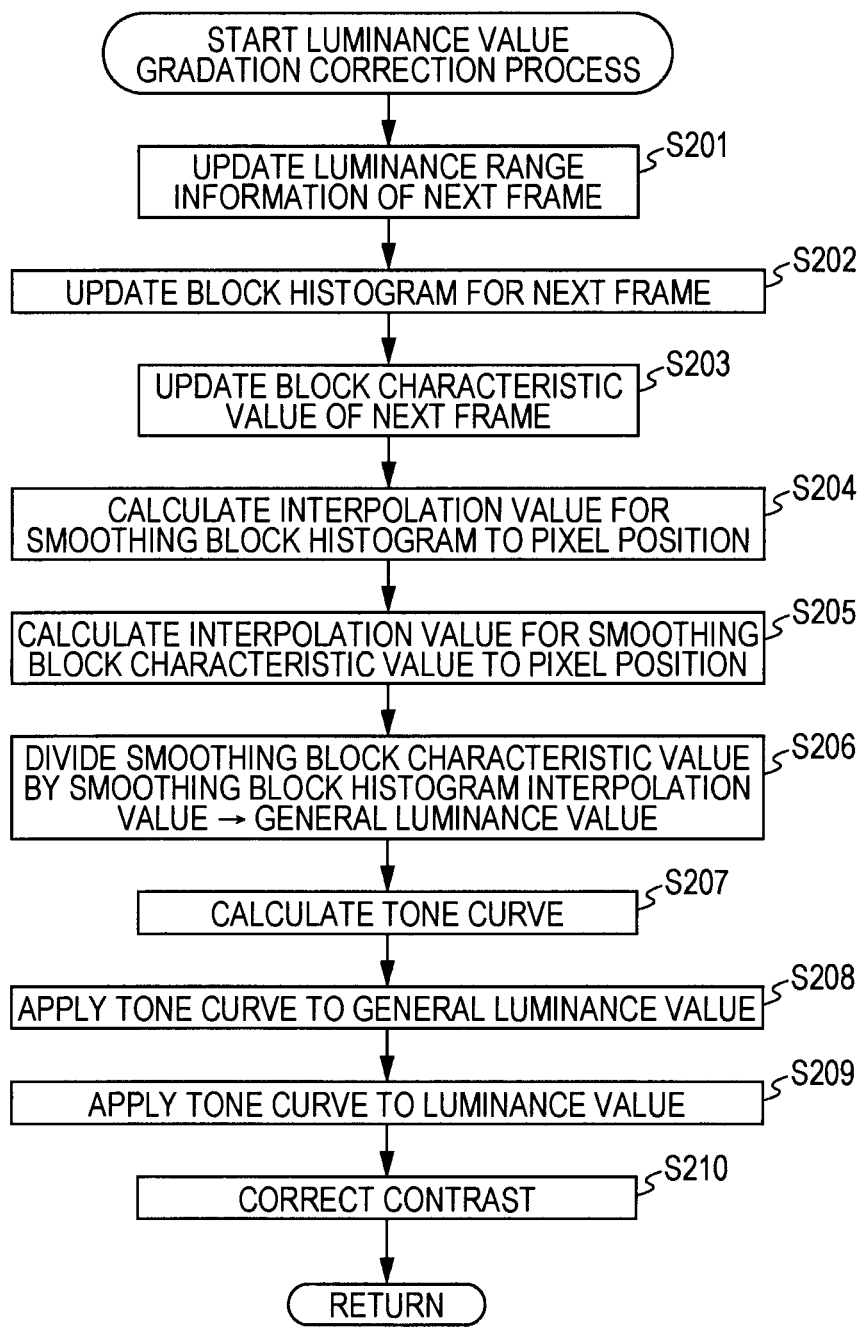
FIG. 31 is a flowchart illustrating a luminance value gradation correction process.

FIG. 31 is a flowchart illustrating the operation order in the process of step S165 of FIG. 30, that is, a luminance value gradation correction process corresponding to the process of step S165.

The process illustrated in the flowchart is the portion that performs a process of pixel unit in a process block illustrated in FIGS. 25 and 16. The operation order of the convolution unit 315 (FIG. 16) that does not performs a process of pixel unit is separately described.

In step S201, the luminance range information calculation unit 491 (FIG. 25) estimates the luminance of the pixel position and updates the calculation result of the luminance range information for the next frame until now.

In step S202, the histogram calculation unit 312 (FIG. 16) estimates the luminance of the pixel position and updates the calculation result of the corresponding bin of the block histogram for the next frame until now.

In step S203, the characteristic value calculation unit 311 (FIG. 16) estimates the luminance of the pixel position and updates the calculation result of the corresponding bin of the block characteristic value for the next frame until now.

In step S204, the interpolation unit 319 (FIG. 16) calculates an interpolation value to the pixel position of the frequency expectation value while referring to the frequency expectation value stored in the smoothing block histogram 317 (FIG. 16).

In step S205, the interpolation unit 318 (FIG. 16) calculates an interpolation value to the pixel position of the characteristic integration value while referring to the characteristic value stored in the smoothing block characteristic value 316 (FIG. 16).

In step S206, the division unit 320 (FIG. 16) divides the characteristic integration value interpolated to the pixel position by the frequency expectation value interpolated to the pixel position, and makes it a general luminance value.

In step S207, the tone curve calculation unit 494 (FIG. 25) calculates a tone curve shape of the pixel position from the luminance range information stored in the luminance range information store 492 (FIG. 25) and the general luminance value of the pixel position.

In step S208, the mapping unit 496 (FIG. 25) calculates a value obtained by applying the tone curve to the general luminance value of the pixel position while referring to the tone curve of the pixel position.

In step S209, the mapping unit 497 (FIG. 25) calculates a value obtained by applying the tone curve to the luminance value of the pixel position while referring to the tone curve of the pixel position.

In step S210, the contrast correction unit 498 (FIG. 25) calculates the luminance value of the pixel position that has undergone contrast correction while referring to the tone curve of the pixel position and the luminance value and the general luminance value of the pixel position, and outputs the luminance value as the gradation correction result of the luminance of the pixel position. When the gradation correction result of the luminance is output, the luminance value gradation correction process is finished and then the process proceeds to step S166 of FIG. 30.

The operation of the luminance value gradation correction process is finished as described above.

Figure 32:
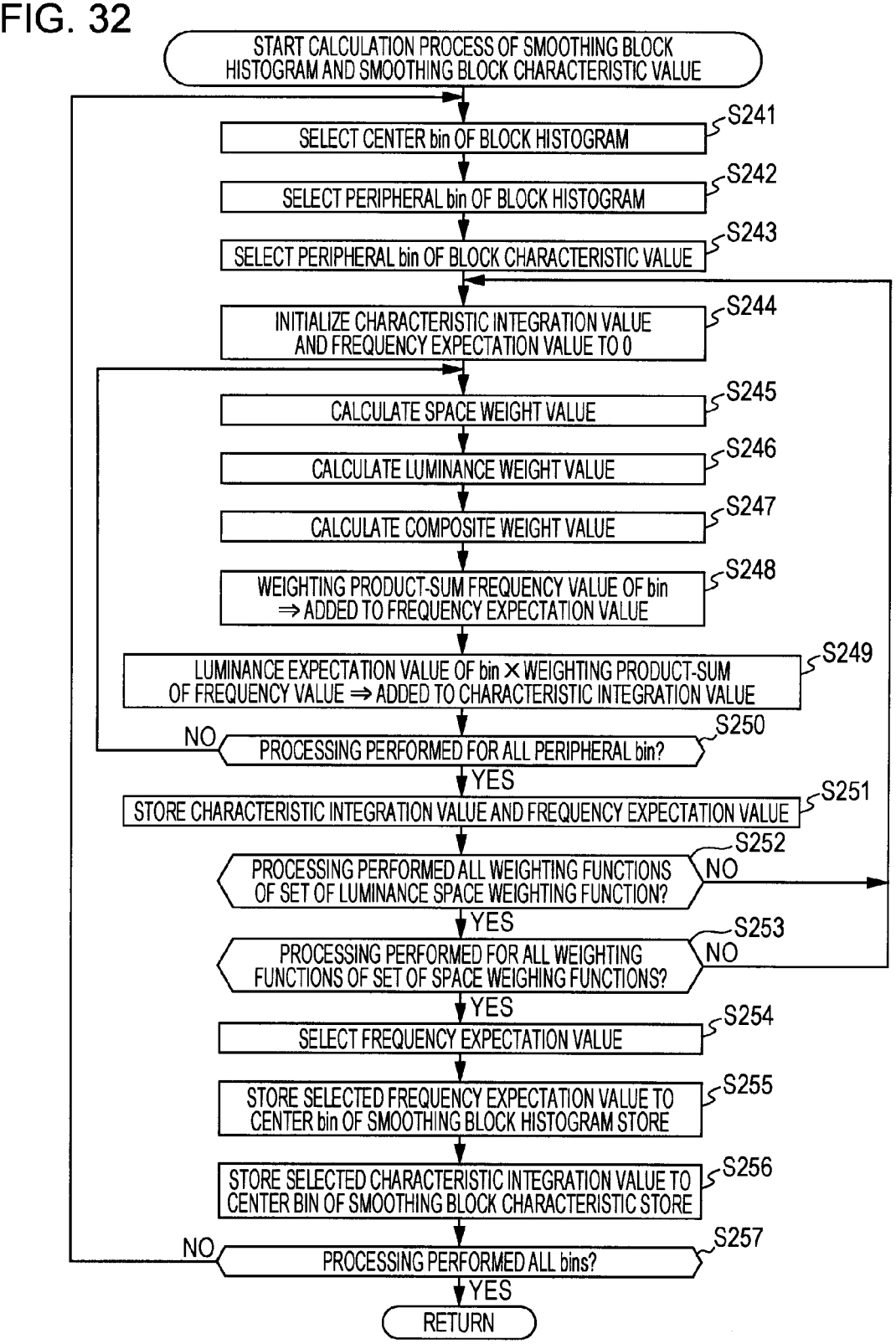
FIG. 32 is a flowchart illustrating a calculation process of a smoothing block histogram and a smoothing block characteristic value.

FIG. 32 is a flowchart illustrating the operation order of a calculation process of a smoothing block histogram and a smoothing block characteristic value, which corresponds to the process of step S173 of FIG. 30. The process configuration corresponds to the internal process (FIG. 18) of the convolution unit 315 (FIG. 16).

The calculation process of the smoothing block histogram and the smoothing block characteristic value is performed on each bin (hereafter, center bin) position of the block histogram.

In step S241, the center bin selection unit 353 selects the bin at the center bin position of the block histogram.

In step S242, the peripheral bin selection unit 352 selects peripheral bins of the block histogram positioned around the center bin position.

In step S243, the peripheral bin selection unit 351 selects peripheral bins of the block characteristic value positioned around the center bin position.

Thereafter, the processes of step S244 to step S253 are performed on the weighting functions of the space weighting function set 381 and the processes of step S244 to step S252 are performed on the weighting functions of the luminance weighting function set 382.

That is, in step S244, the characteristic values and the luminance expectation values corresponding to combination of the space weighting functions and the luminance weighting functions are initialized to 0.

In step S245, the space distance calculation unit 354 and the space weight calculation unit 356 calculate space weight values based on the center bin, the peripheral bins, and the space weighting function.

In step S246, the luminance distance calculation unit 355 and the luminance weight calculation unit 357 calculates luminance weight values based on the center bin, the peripheral bins, and the luminance weighting function.

In step S247, the multiplication unit 358 calculates a composite weight value obtained by multiplying the space weight value by the luminance weight value.

In step S248, the product-sum unit 360 calculates values obtained by multiplying the composite weight value by the luminance values of the peripheral bins and add the values to the calculation result of the frequency expectation value until now.

In step 249, the product-sum unit 359 calculates values obtained by multiplying the composite weight value, the frequency values of the peripheral bins, and the luminance expectation values of the peripheral bins, and adds the values to the calculation result of the characteristic expectation value until now.

In step S250, it is determined whether the processes from step S245 to step S249 have been performed at all the peripheral bins.

When it is determined that the process has not been performed on all the peripheral bins in step S250, the process returns to step S245 and the processes described above are repeated.

Meanwhile, when it is determined that the process has been performed on all the peripheral bins in step S250, the process proceeds to step S251.

In step S251, the results of the frequency expectation value and the characteristic integration value corresponding to the combination of the space weighting function and the luminance weighting function are retained in the characteristic integration value store 383 and the frequency expectation value store 384, respectively.

In step S252, it is determined whether the processes from step S244 to step S251 have been performed on all the weighting functions of the luminance weighting function set 382.

When it is determined that the process has not been performed on all the weighting functions in step S252, the process returns to step S244 and the processes described above are repeated.

Meanwhile, when it is determined that the process has been performed on all the weighting functions in step S252, the process proceeds to step S253.

In step S253, it is determined whether the processes from step S244 to step S252 have been performed on all the weighting functions of the space weighting function set 381.

When it is determined that the process has not been performed on all the weighting functions in step S253, the process returns to step S244 and the processes described above are repeated.

On the other hand, when it is determined that the process has been performed on all the weighting functions in step S253, that is, when the process has been performed on the combination of all of the space weighting functions and luminance weighting functions, the process proceeds to step S254.

In step S254, the frequency expectation value selection unit 385 selects a set of a characteristic integration value and a frequency expectation integration value.

In step S255, the selected frequency expectation value is stored to the center bin position of the smoothing block histogram store 317.

In step S256, the selected characteristic integration value is stored to the center bin position of the smoothing block characteristic store 316.

In step S257, it is determined whether the processes from step S241 to step S256 have been performed at all the bin positions.

When it is determined that the process has not been performed on all the bin positions in step S257, the process returns to step S241 and the processes described above are repeated.

On the other hand when it is determined that the process has been performed on all the bin positions of the block histogram in step S257, the calculation process of the smoothing block histogram and the smoothing block characteristic value is finished and the process proceeds to the step S174 of FIG. 30.

The operation of the calculation process of the smoothing block histogram and the smoothing block characteristic value is finished as described above.

The process order is as described above.

Variations

How the present technology is used was described through the embodiments described above. However, the present technology is not limited to the embodiments.

For example, although the first configuration of the present technology is used for noise reduction of luminance, second and third configurations may be used for reduction of a luminance noise. Similarly, the first and third configurations may be used for color difference noise reduction and the first and second configurations may be used for gradation correction.

Further, the characteristic value in the second and third configurations of the present technology may be values other than the luminance or color difference which are described in the embodiments. For example, it may be any channel of the RGB image.

Further, in selection of the weighting functions of the present technology, only any one of the space weight and the luminance weight may be selected.

Further, in the third configuration of the present technology, it is possible to achieve the effect of the present technology, even if the smoothing block histogram and the smoothing block characteristic value that are the results of convolution of the selected weighting function are changed (generally, reduced) in size (the number of block division or bin division), if necessary.

The series of processes described above may be performed by hardware or by software. When the series of processes are performed by software, various functions can be performed by a computer with exclusive hardware where the programs constituting the software are coded, or by installing various programs, and for example, the programs are installed from a program recording medium to a common personal computer.

Figure 33:
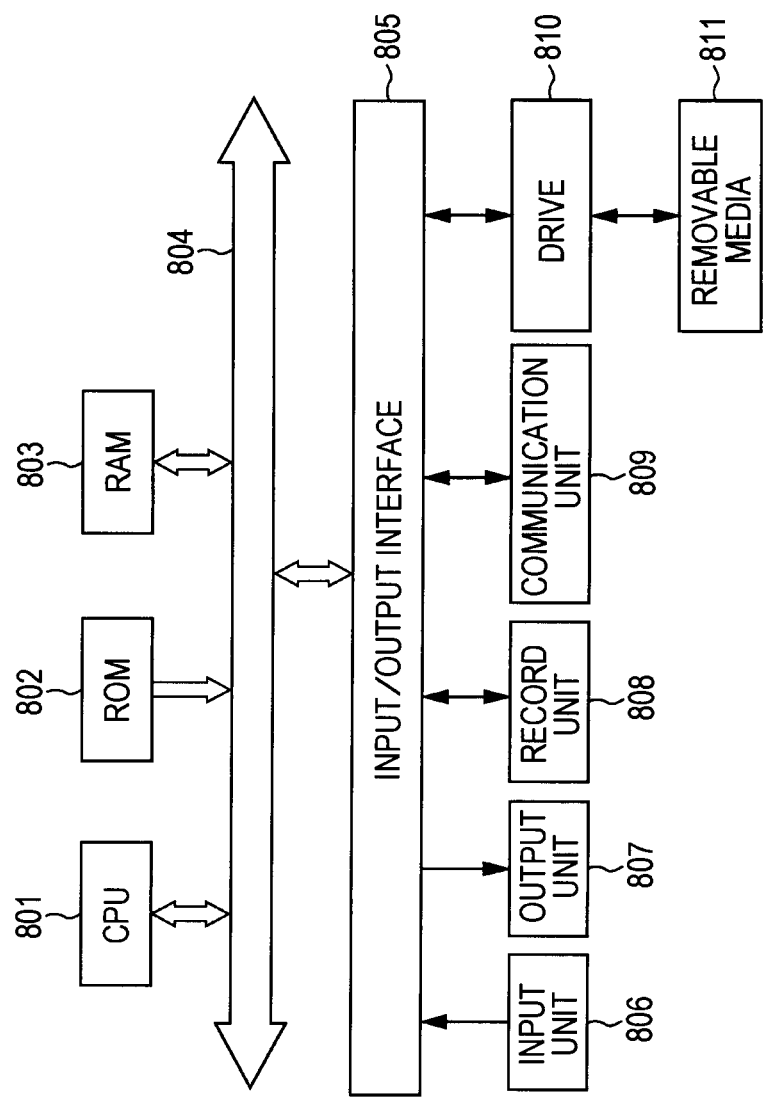
FIG. 33 is a diagram showing an example of the configuration of a computer.

FIG. 33 is a block diagram showing an example of the configuration of hardware of a computer that performs the series of processes described above, using programs.

In the computer, a CPU 801, a ROM (Read Only Memory) 802, and a RAM 803 are connected with each other by a bus 804.

Further, an I/O interface 804 is connected to the bus 805. An input unit 806 implemented by a keyboard, a mouse, or a microphone, an output unit 807 implemented by a display or a speaker, a recording unit 808 implemented by a hard disc or a nonvolatile memory, a communication unit 809 implemented by a network interface, and a drive 810 driving a remote media 811, such as magnetic disk, an optical disk, a magneto-optical disk, or a semiconductor memory, are connected to the I/O interface 805.

In the computer having the configuration described above, as the CPU 801 loads the programs recorded, for example, in the recording unit 808 through the I/O interface 805 and the bus 804 to the RAM 803 and executes the programs, the series of processes described above is performed.

The programs that are executed by the computer (CPU 801) are recorded on the removable media 811 that is a package media implemented by, for example, a magnetic disk (including a flexible disk), an optical disk (CD-ROM (Compact Disc-Read Only Memory), a DVD (Digital Versatile Disc), a magneto optical disk, or a semiconductor memory, or provided through a wire or wireless transmission medium, such as a local network, the internet, or digital satellite broadcasting.

The programs can be installed in the recording unit 808 through the I/O interface 805 by mounting the removable media 811 into the drive 810, in the computer. Further, the programs can be received by the communication unit 809 and installed in the recording unit 808 through a wire or wireless transmission medium. Further, the programs may be installed in advance in the ROM 802 or the recording unit 808.

Further, the programs that are executed by the computer may be programs that performs a process in time series in accordance with the order described herein, or may be programs that performs a process in parallel or at a necessary timing when being called.

Further, the embodiments of the present technology are not limited to those described above and may be modified in various ways without departing from the scope of the present technology.

The present technology contains subject matter related to that disclosed in Japanese Priority Patent Application JP 2011-078872 filed in the Japan Patent Office on Mar. 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a plurality of normalized weighting functions for calculating weight values based on difference values between a pixel value of a pixel position in an image data and pixel values of pixels of a peripheral region of the pixel position;
a unit that calculates the total sum of weights of all the pixels in the peripheral region, for the plurality of normalized weighting functions;
a unit that selects one of the normalized weighting functions on the basis of the total sum of the weight values; and
a unit that calculates expectation values of the pixel values in the peripheral region based on weight values calculated for the pixels in the peripheral region and also based on the selected normalized weighting function,
wherein the expectation values are made to be the calculation results of the pixel position, and
wherein the unit that calculates the total sum of weights of all the pixels in the peripheral region, the unit that selects the one of the normalized weighting functions, and the unit that calculates the expectation values of the pixel values in the peripheral region are each implemented via at least one processor.

2. The image processing apparatus according to claim 1, wherein the unit that selects one of the normalized weighting functions selects the one normalized weighting function making the total sum of the weights maximum.

3. The image processing apparatus according to claim 1, wherein the unit that selects one of the normalized weighting functions extracts the maximum value of the total sum of the weight values and values within a predetermined allowable width from the maximum value, and selects a function with the maximum function width from the normalized weighting functions corresponding to the total sum of the extracted weight values.

4. An image processing method comprising:
retaining a plurality of normalized weighting functions for calculating weight values based on difference values between a pixel value of a pixel position in an image data and pixel values of pixels of a peripheral region of the pixel position;
calculating the total sum of weight of all the pixels in the peripheral region, for the plurality of normalized weighting functions;
selecting one of the normalized weighting functions on the basis of the total sum of the weight values; and
calculating expectation values of the pixel values in the peripheral region based on weight values calculated for the pixels in the peripheral region and also based on the selected normalized weighting function,
wherein the expectation values are made to be the calculation results of the pixel position.

5. A non-transitory computer-readable medium having embodied thereon a program, which when executed by a computer causes the computer to execute a process comprising:
retaining a plurality of normalized weighting functions for calculating weight values based on difference values between a pixel value of a pixel position in an image data and pixel values of pixels of a peripheral region of the pixel position;
calculating the total sum of weight of all of pixels in the peripheral region, for the plurality of normalized weighting functions;
selecting one of the normalized weighting functions on the basis of the total sum of the weight values; and
calculating the expectation values of the pixel values in the peripheral region based on weight values calculated for the pixels in the peripheral region and also based on the selected normalized weighting function,
wherein the expectation values are made to be the calculation results of the pixel position.

6. The image processing method according to claim 4, wherein the selected one of the normalized weighting functions is a normalized weighting function that makes the total sum of the weights maximum.

7. The image processing method according to claim 4, wherein the one of the normalized weighting functions is selected by extracting the maximum value of the total sum of the weight values and values within a predetermined allowable width from the maximum value, and selecting a function with the maximum function width from the normalized weighting functions corresponding to the total sum of the extracted weight values.

8. The non-transitory computer-readable medium according to claim 5, wherein the selected one of the normalized weighting functions is a normalized weighting function that makes the total sum of the weights maximum.

9. The non-transitory computer-readable medium according to claim 5, wherein the one of the normalized weighting functions is selected by extracting the maximum value of the total sum of the weight values and values within a predetermined allowable width from the maximum value, and selecting a function with the maximum function width from the normalized weighting functions corresponding to the total sum of the extracted weight values.

* * * * *